(12) United States Patent
Seo et al.

(10) Patent No.: US 6,426,940 B1
(45) Date of Patent: Jul. 30, 2002

(54) LARGE SCALED FAULT TOLERANT ATM SWITCH AND A SELF-ROUTING METHOD IN A 2N×N MULTIPLEXING SWITCH

(75) Inventors: Young-Ik Seo; Chong-Nam Lee, both of Seoul (KR)

(73) Assignee: Samsung Electronics, Co. Ltd., Suwon (KR)

( * ) Notice: Subject to any disclaimer, the term of this patent is extended or adjusted under 35 U.S.C. 154(b) by 0 days.

(21) Appl. No.: 09/106,743

(22) Filed: Jun. 30, 1998

(30) Foreign Application Priority Data

Jun. 30, 1997 (KR) .......................................... 97-29587

(51) Int. Cl.[7] ................................................ H04L 1/00
(52) U.S. Cl. ...................................... 370/216; 370/217
(58) Field of Search ................................ 370/216, 217, 370/218, 392, 388

(56) References Cited

U.S. PATENT DOCUMENTS

| 5,130,984 A | 7/1992 | Cisneros |
| 5,166,926 A | 11/1992 | Cisneros et al. |
| 5,274,642 A | 12/1993 | Widjaja et al. |
| 5,305,319 A | 4/1994 | Sowell |
| 5,367,520 A | 11/1994 | Cordell |
| 5,414,703 A | 5/1995 | Sakaue et al. |
| 5,467,347 A | 11/1995 | Petersen |
| 5,493,566 A | 2/1996 | Ljungberg et al. |
| 5,557,621 A | 9/1996 | Nakano et al. |
| 5,689,500 A | * 11/1997 | Chiussi et al. ............... 370/235 |
| 6,052,373 A | * 4/2000 | Lau ............................. 370/399 |

* cited by examiner

Primary Examiner—Melvin Marcelo
Assistant Examiner—Ron Abelson
(74) Attorney, Agent, or Firm—Robert E. Bushnell, Esq.

(57) ABSTRACT

A large-scale fault tolerant asynchronous transfer mode (ATM) switch and a self-routing method in a 2n×n multiplexing switch. The 2n×n multiplexing switch includes 2n valid (VD) extracting parts generating valid (VD) signals, wherein it is used to select a cell among the 2n cells inputted every cell period according to the routing tag and store it to a FIFO; a FIFO selecting part selecting the FIFO where each cell selected using valid (VD) signals is to be stored and transmitting the cell to the corresponding FIFO; 2n shared FIFO buffers storing the 2n cells transmitted through the FIFO selecting part; outputting part transmitting the cells stored in the shared FIFO buffers to the output ports; cell counting part counting the number of cells stored in the shared FIFO buffers by using the information transmitted from the FIFO selecting part and outputting part; back-pressure signal generating part making the back-pressure signals by using the information from the cell counting part; and fault detector monitoring the faults of input ports by inputting the 2n valid (VD) signals from the valid (VD) extracting part.

32 Claims, 21 Drawing Sheets

*FIG. 17*

| 1 | 2 | 3 | 4 | ... | I | I+1 | ... | N/n-2 | N/n-1 | N/n |
|---|---|---|---|-----|---|-----|-----|-------|-------|-----|
| ? | ? | ? | ? | ... | ? | ?   | ... | ?     | ?     | ?   |

400  
410  
420  
305

LARGE SCALED FAULT TOLERANT ATM SWITCH AND A SELF-ROUTING METHOD IN A 2N×N MULTIPLEXING SWITCH

CLAIM OF PRIORITY

This application makes reference to, incorporates the same herein, and claims all benefits accruing under 35 U.S.C. §119 from an application entitled A LARGE-SCALED ATM SWITCH WITH FAULT TOLERANT SCHEME AND A SELF-ROUTING METHOD IN A 2N×N MULTIPLEXING SWITCH earlier filed in the Korean Industrial Property Office on Jun. 30, 1997, and there duly assigned Serial No. 29587/1997 a copy of which is annexed hereto.

BACKGROUND OF THE INVENTION

1. Technical Field

The present invention relates to a large-scale fault tolerant asynchronous transfer mode (ATM) switch and a method for implementing a large-scale asynchronous transfer mode (ATM) switch.

2. Related Art

In general, packet-switching technologies are used to relay data traffic via an address contained within a packet. Asynchronous transfer mode (ATM) is one of a class of such packet-switching technologies. Asynchronous transfer mode (ATM) is a telecommunications technique defined by American National Standards Institute (ANSI) and International Telegraph and Telephone Consultative Committee (CCITT).

American National Standards Institute (ANSI) is a non-profit organization formed in 1918 to coordinate private sector standards development in the United States. The International Telegraph and Telephone Consultative Committee (CCITT) is an international committee established to promote standards for the development of telephone, telegraph systems, and data networks and to create the environment for interworking between the networks of the different countries of the world.

There are different types of asynchronous transfer mode (ATM) switches. The term "switch fabric" refers to the method of data being switched from one node to another within a network. The term "cell" refers to a fixed-length unit of data traveling through the switch fabric. Cell switching breaks up data streams into small units that are independently routed through the switch. The routing occurs mostly in hardware through the switching fabric. The combination of cell switching and scaleable switching fabrics are key components of asynchronous transfer mode (ATM).

In the area of asynchronous transfer mode (ATM) data transfer, consider a conventional large-scaled N×N switch and a method for implementing a large-scaled N×N switch using a 2n×n multiplexing switch architecture and n×n output switch. Any type of switch is allowed for the n×n output switch, but 2n×n multiplexing switch is made up of output buffering type switches. The multiplexing switch selects just the cells to be transmitted to n output ports, considering the routing tag according to the position of each switch among 2n inputs and transmits the cells as output.

For implementing a large-scale N×N switch, $1+\log_2(N/n)$ stages are required and each stage needs $(N/n)$ switches. The stages from the first stage to $\log_2(N/n)$ stage consist of a plurality of 2n×n multiplexing switches. The last stage consists of a plurality of n×n output switches. Therefore, $(N/n)\times\log_2(N/n)$ 2n×n multiplexing switches and $(N/n)$ n×n output switches are required to implement a large-scaled N×N switch.

As a result of simulation for implementing the conventional large-scale N×N switch as mentioned above, it is known that on the average, the buffer within the 2n×n multiplexing switch that is positioned closest to the n×n output switch, has the lost cells. In other words, the 2n×n multiplexing switch at $s(\log_2(N/n),k)$ has the lost cells. The earlier a stage is, the fewer cells the buffer has. So, it results in that the probability of occurrence of cell loss in the 2n×n multiplexing switch at the last stage becomes higher, but on the other hand the cell loss ratio at earlier stages becomes considerably lower.

In the 2n×n multiplexing switch, the cells on the equal conditions are outputted to the n output ports in view of each switch. However there is a problem in that if one of the n output ports had some problems, the cell loss would occur continuously.

A variety of ATM switches and related devices currently exist, as disclosed in U.S. Pat. No. 5,274,642 to Widjaja et al. entitled Output Buffered Packet Switch With A Flexible Buffer Management Scheme, U.S. Pat. No. 5,367,520 to Cordell entitled Method And System For Routing Cells In An ATM Switch, U.S. Pat. No. 5,305,319 to Sowell entitled FIFO For Coupling Asynchronous Channels, U.S. Pat. No. 5,414,703 to Sakaue et al. entitled Asynchronous Cell Switch, U.S. Pat. No. 5,467,347 to Petersen entitled Controlled Access ATM Switch, U.S. Pat. No. 5,493,566 to Ljungberg et al. entitled Flow Control System For Packet Switches, U.S. Pat. No. 5,557,621 to Nakano et al. entitled ATM Switch And Control Method Thereof, U.S. Pat. No. 5,166,926 to Cisneros et al. entitled Packet Address Look-Ahead Technique For Use In Implementing A High Speed Packet Switch, and U.S. Pat. No. 5,130,984 to Cisneros entitled Large Fault Tolerant Packet Switch Particularly Suited For Asynchronous Transfer Mode (ATM) Communication.

Even though a variety of ATM switches and related devices currently exist, I believe that there is a need for an enhanced ATM switch and a self-routing method in order to solve the aforementioned problem.

SUMMARY OF THE INVENTION

For solving the above problems, the present invention is intended to provide a large-scale fault tolerant asynchronous transfer mode (ATM) switch to considerably reduce the cell loss probability and a self-routing method in a 2n×n multiplexing switch to transmit cells more quickly.

A 2n×n multiplexing switch for a large-scaled fault tolerant ATM switch includes:

2n valid (VD) extracting part which generates a valid (VD) signal and is used to select a cell among the 2n cells inputted every cell period according to the routing tag and to store said cell to a first in first out (FIFO) buffer;

FIFO selecting part which selects the FIFO buffer for each cell selected by using the valid (VD) signal to be stored and transmits the cell to the corresponding FIFO buffer;

2n shared FIFO buffers storing the 2n cells transmitted through the FIFO selecting part;

outputting part transmitting the cells stored in the shared FIFO buffers to the output ports;

cell counting part counting the number of cells stored in the shared FIFO buffers by using the information transmitted from the FIFO selecting part and outputting part;

back-pressure signal generating part which generates the back-pressure signals by using the information from the cell counting part; and fault detector monitoring the faults of input ports by inputting the 2n valid (VD) signals from the valid (VD) extracting part.

According to one embodiment of a 2n×n multiplexing switch for a large-scaled fault tolerant ATM switch, it is preferable that the FIFO selecting part further comprises:

FIFO address extracting part generating the address of the FIFO where the inputted cell is to be stored; and Banyan routing network transmitting the cell to the shared FIFO buffers by using the data generated in the FIFO address extracting part.

According to one embodiment of a 2n×n multiplexing switch for a large-scaled fault tolerant ATM switch, it is preferable that the FIFO address extracting part further comprises:

2n adders such that one of 2n valid (VD) signals is inputted in an adder and the result of the operation is outputted to the just next stage of the adder; and 2n buffers inputting the output of the adder of the present stage among the 2n adders.

According to one embodiment of a 2n×n multiplexing switch for a large-scaled fault tolerant ATM switch, it is preferable that the outputting part further comprises:

read FIFO address (RFA) generator generating n read FIFO address (RFA) signals for selecting the FIFO number to be read;

FIFO read enable (FRE) generator generating 2n FIFO read enable (FRE) signals by using the read FIFO address (RFA) signal; and output-cell multiplexing part transmitting n cells to the output ports among 2n cells read from the shared FIFO buffering part by using the read FIFO address (RFA) signal.

According to one embodiment of a 2n×n multiplexing switch for a large-scaled fault tolerant ATM switch, it is preferable that the read FIFO address (RFA) generator further comprises:

shift register inputting n fault detection indicators (FDI) sequentially;

n AND-gates which inputs one of n Fault Detection Indicators from the shift register, a signal determined by the cell count (CCNT) from the cell counting part and back-pressure indicator (BPI) respectively;

register inputting the output of each AND-gate simultaneously;

n adders such that the AEN of the register is inputted in an adder and the result of the operation is outputted to the just next stage of the adder; and n buffers inputting the output of the adder of the present stage among the n adders.

According to one embodiment of a 2n×n multiplexing switch for a large-scaled fault tolerant ATM switch, it is preferable that the FIFO read enable (FRE) generator generates 2n FRE (FIFO read enable) signals by using (4n+1) comparators, 8n AND-gates and (4n+1) OR-gates.

According to one embodiment of a 2n×n multiplexing switch for a large-scaled fault tolerant ATM switch, it is preferable that the fault detector comprises two fault signal generators including (2n+1) comparators, 4n AND-gates, (2n+1) OR-gates and shift register and generates the fault signal for each port of input stages.

According to one embodiment of a 2n×n multiplexing switch for a large-scaled fault tolerant ATM switch, it is preferable that the output cell multiplexing part comprises n 2n×1 multiplexers.

According to one embodiment of a 2n×n multiplexing switch for a large-scaled fault tolerant ATM switch, it is preferable that the cell counter consists of two subtractors and a counter.

According to one embodiment of a 2n×n multiplexing switch for a large-scaled fault tolerant ATM switch, it is preferable that the back-pressure signal generating part comprises:

two AND-gates;

two comparators inputting the output of the AND-gates respectively;

OR-gate adding the outputs of the two comparators logically; and buffer temporally storing the output of the OR gate.

A self-routing method in a 2n×n multiplexing switch for a large-scaled fault tolerant ATM switch includes the steps of:

searching for the fault of input ports;

informing the result of the search to the switch of the front stage;

receiving the result of fault lines from the rear stage and preventing the cell from being transmitted to the output port corresponding to the result of fault lines;

back-pressure signaling that informs the status if the number of cells stored in the buffer within the switch is more than the specific value; and stopping transmitting cells for the moment if the back-pressure signal is received.

According to one embodiment of a self-routing method in a 2n×n multiplexing switch for a large-scaled fault tolerant ATM switch, it is preferable that when it is provided that A indicates the stage of each switch and k indicates the kth position at each stage of n×n output switch and it is provided that $j = \lfloor ((k-1)n2^Z)/N \rfloor$, where the function $\lfloor X \rfloor$ means the largest integer among the integers less than or equal to X, and $Z = ((\log_2(N/n)) - A + 1)$, the method includes the steps of:

deciding the value of s(A,k), the switch group which a specific switch belongs to, from the values A, k of the specific switch;

defining switch group, sg(A,j) and initializing the value of routing tag, i;

deciding whether it is satisfied with the condition of $i \leq [N/n]$;

deciding whether it is satisfied with the condition of $i >= [((jN)/(n2^Z)) + 1]$;

deciding whether it is satisfied with the condition of $i \leq [((j+1)N)/n2^Z]$;

deciding whether it is satisfied with the condition of f(i)=0; and performing cell-transmission.

According to one embodiment of a self-routing method in a 2n×n multiplexing switch for a large-scaled fault tolerant ATM switch, it is preferable that the cell-transmission is not performed if it is not satisfied with the condition of $i \leq [N/n]$.

According to one embodiment of a self-routing method in a 2n×n multiplexing switch for a large-scaled fault tolerant ATM switch, it is preferable that if it is not satisfied with the conditions, $i >= [((jN)/(n2^Z)) + 1]$, $i \leq [((j+1)N)/n2^Z]$, f(i)=0, then the value of the routing tag, i is incremented by 1 and it is decided whether it is satisfied with the condition of $i \leq [N/n]$.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 17 illustrates the routing tag that is used in the 2n×n multiplexing switch.

DETAILED DESCRIPTION

Figure 1A:
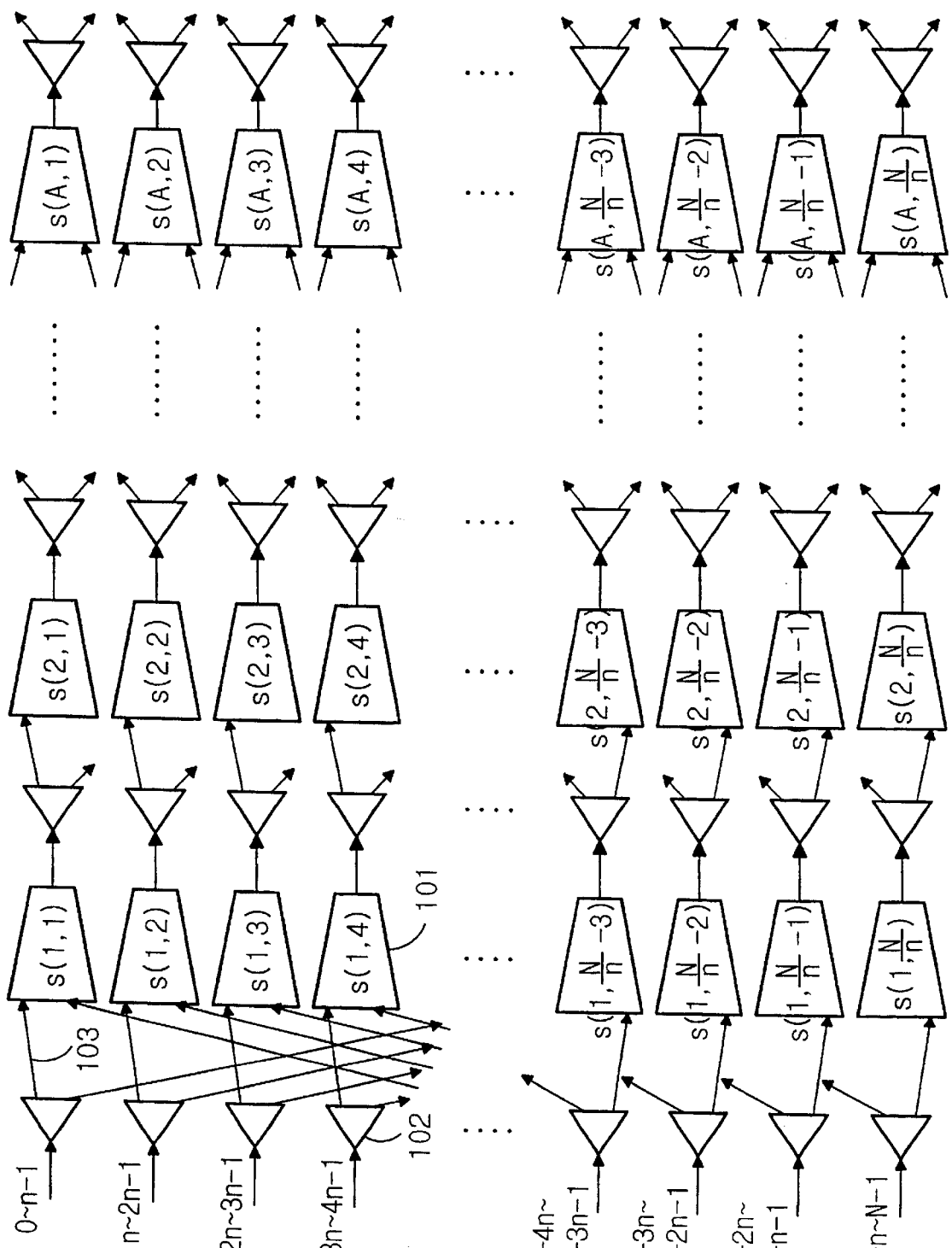
FIGS. 1a and 1b illustrate a conventional large-scaled N×N switch architecture.
Figure 1B:
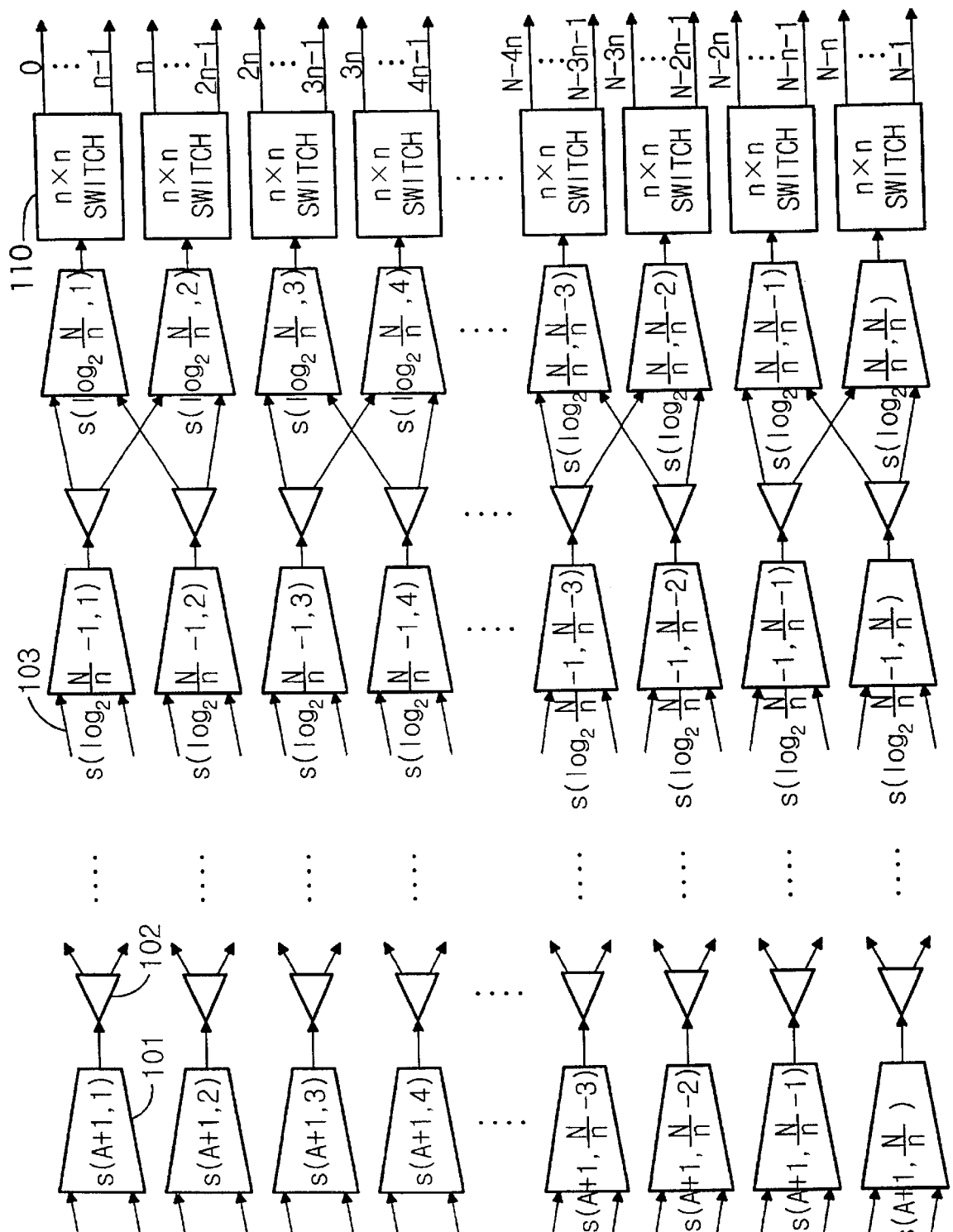

Turn now to FIGS. 1a and 1b, which illustrate a conventional N×N switch architecture. FIGS. 1a and 1b show a method for implementing a large-scaled N×N switch using a 2n×n multiplexing switch architecture and n×n output switch. FIGS. 1a and 1b show a plurality of 2n×n multiplexing switches 101, a plurality of 1×2 copiers 102, a plurality of n-port data lines 103, and a plurality of n×n switches 110.

Any type of switch is allowed for the n×n output switch, but the 2n×n multiplexing switch are made up of output buffering type switches. Each multiplexing switch selects just the cells to be transmitted to n output ports, considering the routing tag according to the position of each switch among 2n inputs and transmits the cells as output.

For implementing a large-scaled N×N switch, $1+\log_2(N/n)$ stages are required and each stage needs (N/n) switches. The stages from the first stage to $\log_2(N/n)$ stage consist of 2n×n multiplexing switches and the last stage consists of n×n output switch. Therefore, $(N/n) \times \log_2(N/n)$ 2n×n multiplexing switches and (N/n) n×n output switches are required to implement a large-scaled N×N switch.

As a result of simulation for implementing the conventional large-scaled N×N switch of FIG. 1 as mentioned above, it is known that on the average, the buffer within the 2n×n multiplexing switch that is positioned most near by the n×n output switch, that is, the 2n×n multiplexing switch at $s(\log_2(N/n),k)$, has the lost cells. The more ahead of stages, the fewer cells the buffer has. So, it results in that the probability of occurrence of cell loss in the 2n×n multiplexing switch at the last stage becomes higher, but on the other hand the cell loss ratio at the more ahead of stage becomes considerably lower.

In the 2n×n multiplexing switch, the cells on the equal conditions are outputted to the n output ports in view of each switch. However there is a problem in that if one of the n output ports had some problems, the cell loss would occur continuously.

Figure 2A:
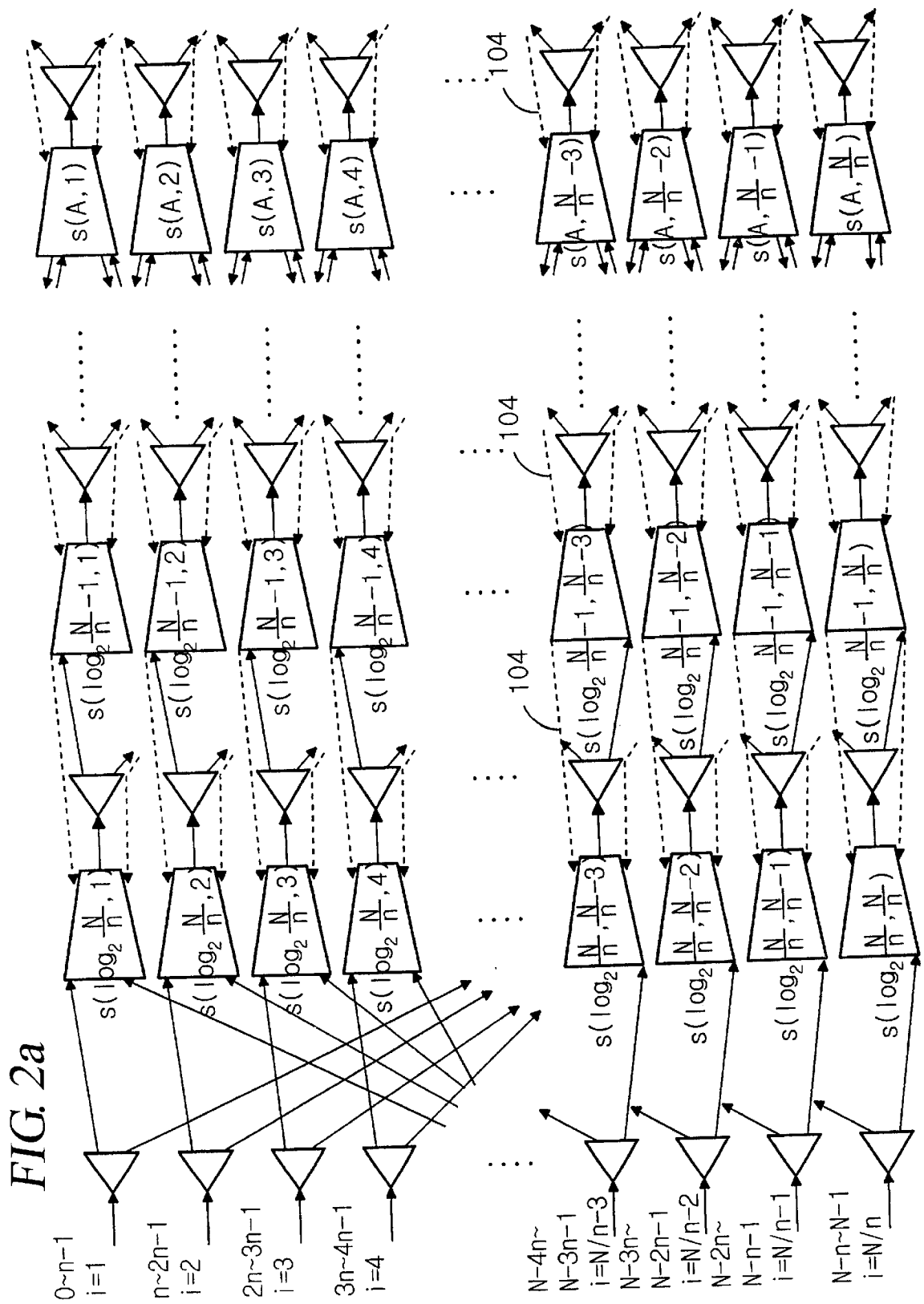
FIGS. 2a and 2b illustrates large-scaled N×N switch architecture, in accordance with the principles of the present invention.
Figure 2B:
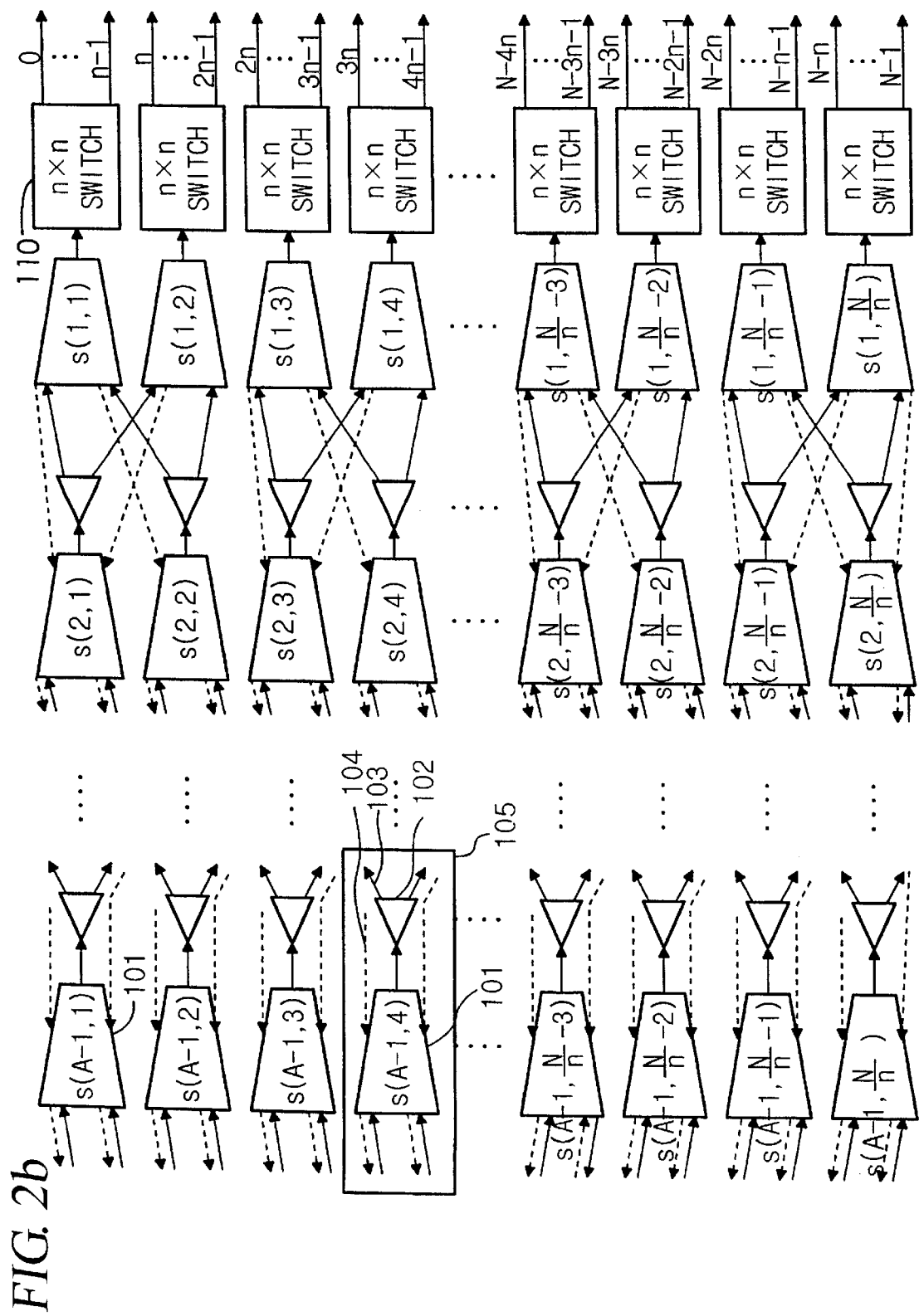

The present invention will be explained in detail with reference to the accompanying drawings. Turn now to FIGS. 2a and 2b, which illustrate large-scaled N×N switch architecture, in accordance with the principles of the present invention. FIGS. 2a and 2b show a plurality of 2n×n multiplexing switches, a plurality of 1×2 copiers, a plurality of n-port data lines, and a plurality of n×n switches. In addition, there is shown a plurality of back pressure signals.

Of the plurality of units and signals shown, the following units and signals are labeled in FIGS. 2a and 2b: One 2n×n multiplexing switch 101, one 1×2 copier 102, one n-port data line 103, one n×n switch 110, and back pressure signals 104. The one 2n×n multiplexing switch 101 in combination with the one 1×2 copier 102 form a multiplexing switch unit 105. The multiplexing switch unit 105 corresponds to the multiplexing switch unit 105 shown in FIG. 4a. Similarly, the n×n switch 110 corresponds to the unit 110 shown in FIG. 4a.

FIGS. 2a and 2b show a large-scaled fault tolerant N×N ATM switch architecture comprising 2n×n multiplexing switches and n×n output switches, in accordance with the principles of the present invention. Here, any type of switch is allowed for the n×n output switch. However, the 2n×n multiplexing switch is made up of output buffering type switches. The multiplexing switch selects just the cells to be transmitted to n output ports, considering the routing tag according to the position of each switch among 2n inputs and transmits the cells as output.

For implementing a large-scaled N×N switch, $1+\log_2(N/n)$ stages are required and each at stage needs (N/n) switches. The stages from the first stage to $\log_2(N/n)$ stage consist of 2n×n multiplexing switches and the n×n output switch needs to be positioned at the starting stage (it is regarded as the $0^{th}$ stage for convenience) to transmit the cell to the destination of the cell. Therefore, $(N/n) \times \log_2(N/n)$ 2n×n multiplexing switches and $(N/n)$ n×n output switches are required to implement a large-scaled N×N switch.

As illustrated in FIGS. 2a and 2b, each 2n×n multiplexing switch is called s(A,B) and N inputs are represented as i grouped by n groups to explain the architecture of the switch, according to the principles of the present invention. Here, A indicates the stage of each switch having a value with range from 1 to $\log_2(N/n)$ and B indicates the position at each stage having a value with range from 1 to N/n and i indicates the representative input ports from (i−1)×n to (i×n)−1 having a value with range from 1 to N/n. The A and B can be practically considered as the identifier of the chip. The value of A may be considered to have value 1 from the input-stage in FIGS. 1a and 1b, but it is necessary for the value to increase starting from the next of n×n output switch toward the input-stage for the purpose of continuous expansion. In result, it is possible to expand the switch toward the larger capacity switch such as 2N×2N switch, etc., without change of the existing N×N switch.

For transmitting a cell, firstly an input-cell is copied as two respectively and then the kth and the (k+N/2n)th input groups, where $1 \leq k \leq (N/2n)$ and k is integer, are inputted to the 2n×n multiplexing switches positioned at $s(\log_2(N/n),k)$ and $s(\log_2(N/n),k+(N/2n))$ of the $\log_2(N/n)$ stage respectively.

Only the cells to be transmitted from the switch to the lower stage are selected and stored in the buffer and then outputted. The cell outputted from the $\log_2(N/n)$ stage is again copied and transmitted to the $\log_2(N/n)-1$ stage. The cells outputted from $s(\log_2(N/n),k)$ and $s(\log_2(N/n),k+(N/4n))$, where $1 \leq k \leq (N/4n)$ and k is integer, are transmitted to $s(\log_2(N/n)-1,k)$ and $s(\log_2(N/n)-1,k+(N/4n))$. The cells outputted from $s(\log_2(N/n),k+N/2n)$ and $s(\log_2(N/n),k+(N/4n)+N/2n)$, where $1 \leq k \leq (N/4n)$ and k is integer, are transmitted to $s(\log_2(N/n)-1,k+N/2n)$ and $s(\log_2(N/n)-1,k+(N/4n)+N/2n)$.

And the cell outputted from the $s(\log_2(N/n)-1,k)$ and $s(\log_2(N/n)-1,k+(N/8n))$ of the second stage, where $1 \leq k \leq N/8n$ and k is integer, are again copied and transmitted to $s(\log_2(N/n)-2,k)$ and $s(\log_2(N/n)-2,k+(N/8n))$ of the $\log_2(N/n)-2$ stage. The cells outputted from $s(\log_2(N/n)-1, k+N/4n)$ and $s(\log_2(N/n)-1,k+(N/8n)+(N/4n))$, where $1 \leq k \leq N/8n$ and k is integer, are transmitted to $s(\log_2(N/n)-2,k+(N/4n))$ and $s(\log_2(N/n)-1,k+(N/8n)+(N/4n))$. The cells outputted from $s(\log_2(N/n)-1,k+2 \times N/4n)$ and $s(\log_2(N/n)-1,k+(N/8n)+2 \times N/4n)$, where $1 \leq k \leq N/8n$ and k is integer, are transmitted to $s(\log_2(N/n)-2,k+2 \times N/4n)$ and $s(\log_2(N/n)-2,k+(N/8n)+2 \times N/4n)$. The cells outputted from $s(\log_2(N/n)-1,k+3 \times N/4n)$ and $s(\log_2(N/n)-1,k+(N/8n)+3 \times N/4n)$, where $1 \leq k \leq N/8n$ and k is integer, are transmitted to $s(\log_2(N/n)-2,k+3 \times N/4n)$ and $s(\log_2(N/n)-2,k+(N/8n)+3 \times N/4n)$.

And the cells outputted from $s(A,k+m \times N/(2^Z n))$ and $s(A,k+N/(2^{Z+1}n)+m \times N/(2^Z n))$ of the Ath stage, where $1 \leq k \leq N/(2^{Z-1}n)$, $1 \leq m \leq 2^Z-1$, $Z=\log_2(N/n)-A+1$ and each of k, m is integer respectively, are transmitted to $s(A-1,k+m \times N/(2^Z n))$ and $s(A-1,k+N/(2^{Z-1}n)+m \times N/(2^Z n))$ of the (A−1)th stage. The cells outputted from s(1,k) of the last stage are not copied and directly transmitted to the kth n×n output switch. The steps as stated above make it possible to implement a large-scaled N×N switch like that as illustrated in FIGS. 1a and 1b.

The line-connection method as stated above can be described briefly as follows.

(1) The kth and (k+N/2n)th input ports group are inputted to each switch of $s(\log_2(N/n),k)$ and $s(\log_2(N/n),k+N/2n)$, where $1 \leq k \leq N/2n$ and k is integer.

(2) The cells outputted from $s(A,k+m \times N/(2^Z n))$ and $s(A, k+N/(2^{Z-1}n)+m \times N/(2^Z n))$ are inputted to each switch of $s(A-1,k+m \times N/(2^Z n))$ and $s(A-1,k+N/(2^{Z+1}n)+m \times N/(2^Z n))$, where each of A, k, m and z is integer satisfying the following conditions of expression 1.

$$2 \leq A \leq \log_2(N/n),$$

$$1 \leq k \leq N/(2^{Z-1}n),$$

$$1 \leq m \leq 2^Z-1,$$

$$Z=\log_2((N/n))-A+1 \qquad \text{[expression 1]}$$

(3) The output of s(1,k) is inputted to the kth n×n output switch, where k is integer satisfying the following conditions of expression 2.

$$1 \leq k \leq N/n \qquad \text{[expression 2]}$$

The back pressure signal 104 and fault detection signal shown as a dotted line in FIGS. 2a and 2b are connected in reverse order of the above line-connection method.

In general, the back pressure signal 104 indicates a signal used so that cells cannot be inputted until the number of cells that exist within the ATM switch decrease to below a specific level.

In the present invention, the back pressure signal 104 is used to prevent more cells from being inputted to the input side when a fault is detected in the exchange.

Figure 3:
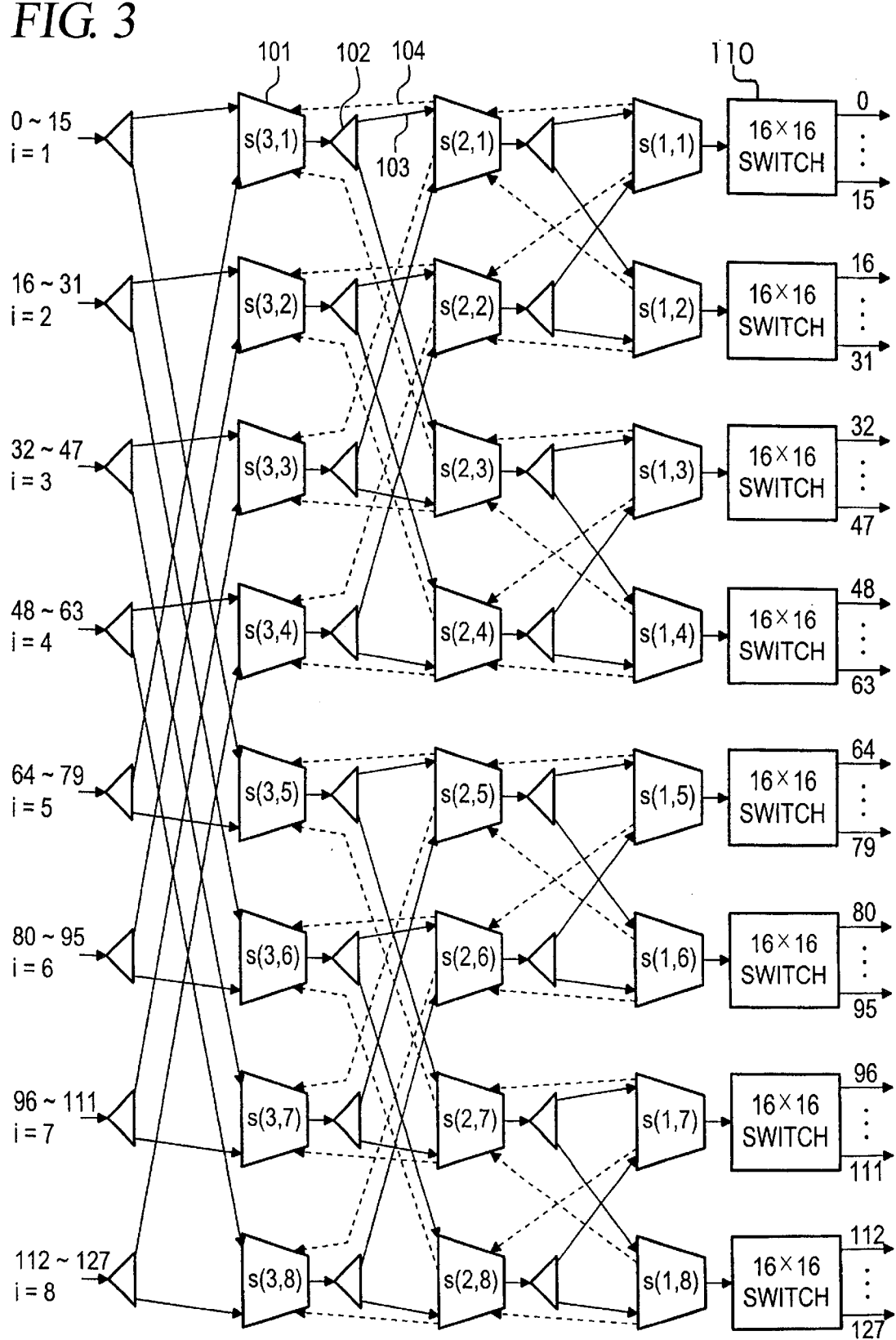
FIG. 3 illustrates a 128×128 switch architecture implemented by using 32×16 multiplexing switches and 16×16 output switches, in accordance with the principles of the present invention.

Hereafter, an embodiment using a method for implementing a large-scaled switch according to the present invention is described in detail referring to drawings. Turn now to FIG. 3, which illustrates a 128×128 switch architecture implemented by using 32×16 multiplexing switches and 16×16 output switches, in accordance with the principles of the present invention. FIG. 3 shows a plurality of 2n×n multiplexing switches 101, a plurality of 1×2 copiers 102, a plurality of n-port data lines 103, and a plurality of n×n switches 110. In addition, there is shown a plurality of back pressure signals 104.

In FIG. 3, it is assumed that n=16, N=128. FIG. 3 illustrates an embodiment of a method for implementing a large-scaled switch according to the present invention. That is, a case of implementing 128×128 switch by using 16×16 switches and 32×16 multiplexing switches is described as follows, according to the above line-connection method:

(a) k is an integer, where $1 \leq k \leq N/2n$ by the line-connection method (1) as described briefly above, and the kth and (k+4)th input ports group are inputted to each switch of s(3,k) and s(3,k+4),
  i=1, 5→s(3, 1), s(3, 5);
  i=2, 6→s(3, 2), s(3, 6);
  i=3, 7→s(3, 3), s(3, 7); and
  i=4, 8→s(3, 4), s(3, 8).

(b) A, k, m and z are integers, where $2 \leq A \leq 3$, $1 \leq k \leq 4/2^Z$, $0 \leq m \leq 2^Z-1$ and $Z=4-A$ by the line-connection method (2) as described briefly above, and the cells outputted from $s(A,k+m \times 8/2^Z)$ and $s(A,k+4/2^Z+m \times 8/2^Z)$ are inputted to each switch of $s(A-1,k+m \times 8/2^Z)$ and $s(A-1,k+4/2^Z+m \times 8/2^Z)$,
  s(3, 1), s(3, 3)→s(2, 1), s(2, 3);
  s(3, 2), s(3, 3)→s(2, 2), s(2, 4);
  s(3, 5), s(3, 3)→s(2, 5), s(2, 7);
  s(3, 6), s(3, 3)→s(2, 6), s(2, 8);
  s(2, 1), s(2, 2)→s(1, 1), s(1, 2);

s(2, 3), s(2, 4)→s(1, 3), s(1, 4);
s(2, 5), s(2, 6)→s(1, 5), s(1, 6); and
s(2, 7), s(2, 8)→s(1, 7), s(1, 8).

(c) k is integer, where $1 \leq k \leq 8$ by the line-connection method (3) as described briefly above, and the output of s(1,k) is inputted to the kth n×n output switch,
the output of s(1, 1) is inputted to the $1^{st}$ 16×16 switch;
the output of s(1, 2) is inputted to the $2^{nd}$ 16×16 switch;
the output of s(1, 3) is inputted to the $3^{rd}$ 16×16 switch;
the output of s(1, 4) is inputted to the $4^{th}$ 16×16 switch;
the output of s(1, 5) is inputted to the $5^{th}$ 16×16 switch;
the output of s(1, 6) is inputted to the $6^{th}$ 16×16 switch;
the output of s(1, 7) is inputted to the $7^{th}$ 16×16 switch; and
the output of s(1, 8) is inputted to the $8^{th}$ 16×16 switch.

With this line-connection method, it is implemented as illustrated in FIG. 3.

The above embodiment is just a representative embodiment and the scope of the present invention is not limited to only the above embodiment.

Figure 4A:
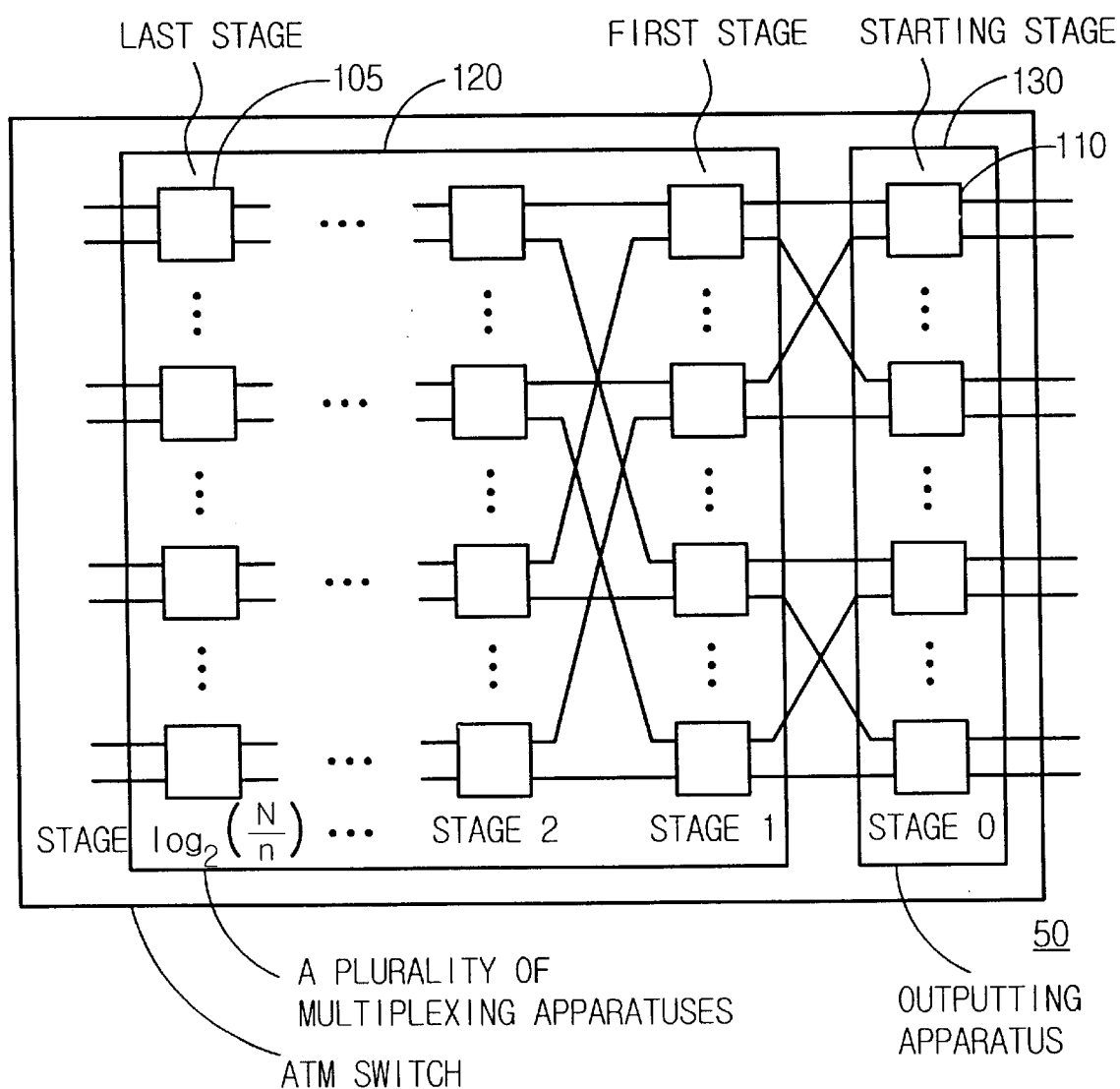
FIG. 4a illustrates an ATM switch, in accordance with the principles of the present invention.

Turn now to FIG. 4a, which illustrates an ATM switch, in accordance with the principles of the present invention. An ATM switch 50 includes a multiplexing switch unit 105, a plurality of multiplexing switch units known as a multiplexing switch module 120, an n×n switch 110, and an outputting apparatus 130.

Figure 4B:
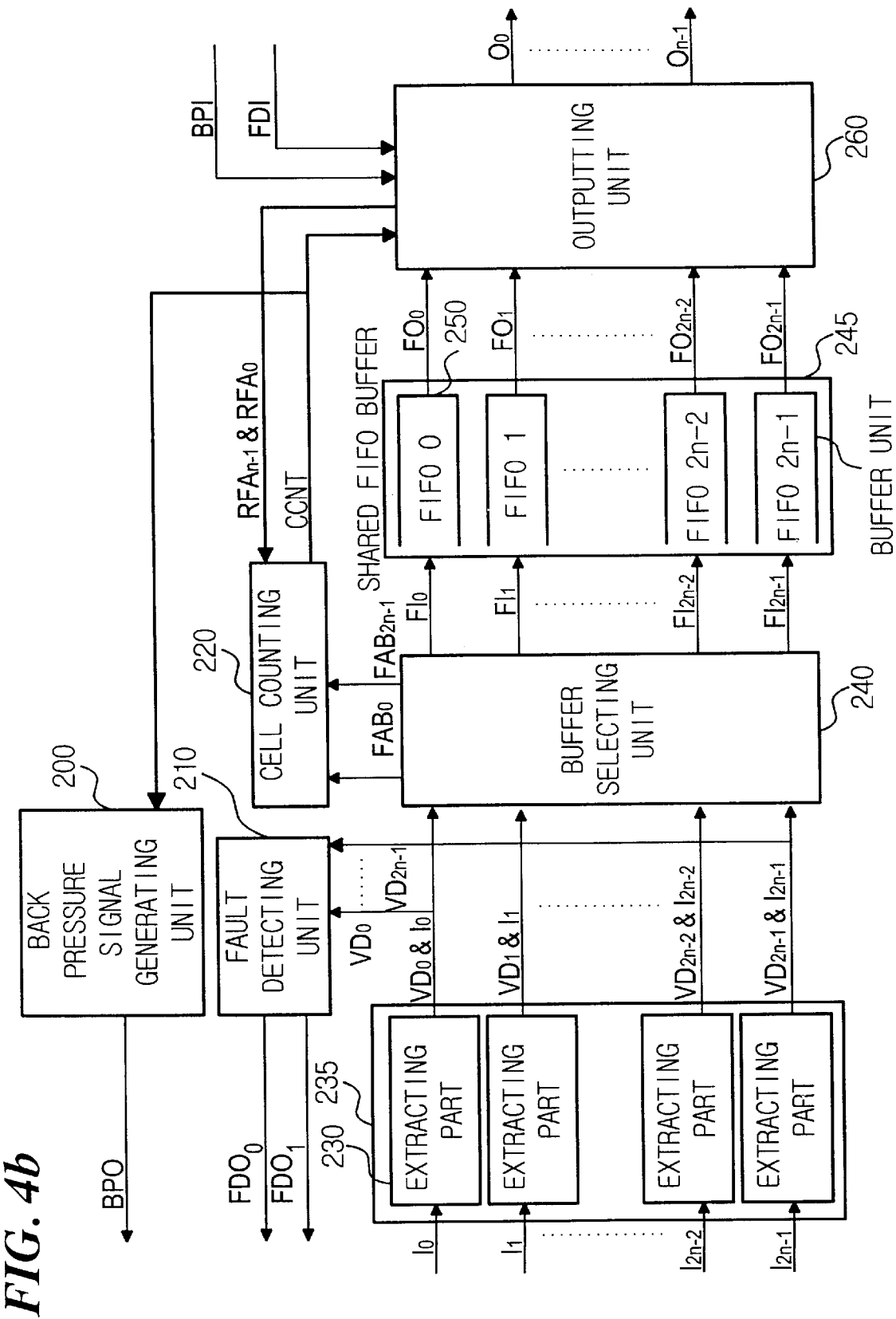
FIG. 4b illustrates a 2n×n multiplexing switch architecture, in accordance with the principles of the present invention.

Turn now to FIG. 4b, which illustrates a 2n×n multiplexing switch architecture, in accordance with the principles of the present invention. FIG. 4b shows a back pressure signal generator 200, a fault detector 210, a cell counter 220, a plurality of valid (VD) extracting parts 230, a generating unit 235, a first in first out (FIFO) selecting part 240, a shared FIFO buffer 245, a plurality of first in first out (FIFO) buffers 250, and an outputting part 260 having output ports. FIG. 4 shows a 2n×n multiplexing switch architecture used to implement a large-scaled N×N switch. The 2n×n multiplexing switch is an apparatus that selects cells among 2n cells ($I_0 \sim I_{2n-1}$) inputted every time interval optionally according to the routing tag, and stores them in first in first out buffer (FIFO buffer) 250 and then outputs n cells ($I_0 \sim I_{n-1}$) every time interval toward output ports. The 2n×n multiplexing switch includes valid (VD) extracting part 230 generating a valid (VD) signal that indicates whether the cell is to be stored in the FIFO buffer 250, referring to the routing tag of the cell inputted, fault detector 210 detecting faults of input ports using the valid (VD) signal, FIFO selecting part 240 that selects the buffer 250 where each cell is to be stored, using the valid (VD) signal and transmits the cell toward the corresponding FIFO side, shared FIFO buffer 245 which is composed of 2n FIFO buffers 250 and stores cells, outputting part 260 that reads the cells stored in the FIFO buffer ($FO_0 \sim FO_{2n-1}$) 250 and transmits them toward the output ports side, cell counter 220 counting the number of cells stored in the present FIFO buffer 250, using the data transmitted from FIFO selecting part 240 and outputting part 260, and back pressure generating part 200 that generates a back pressure signal using the number of cells from the cell counter 220.

Figure 16:
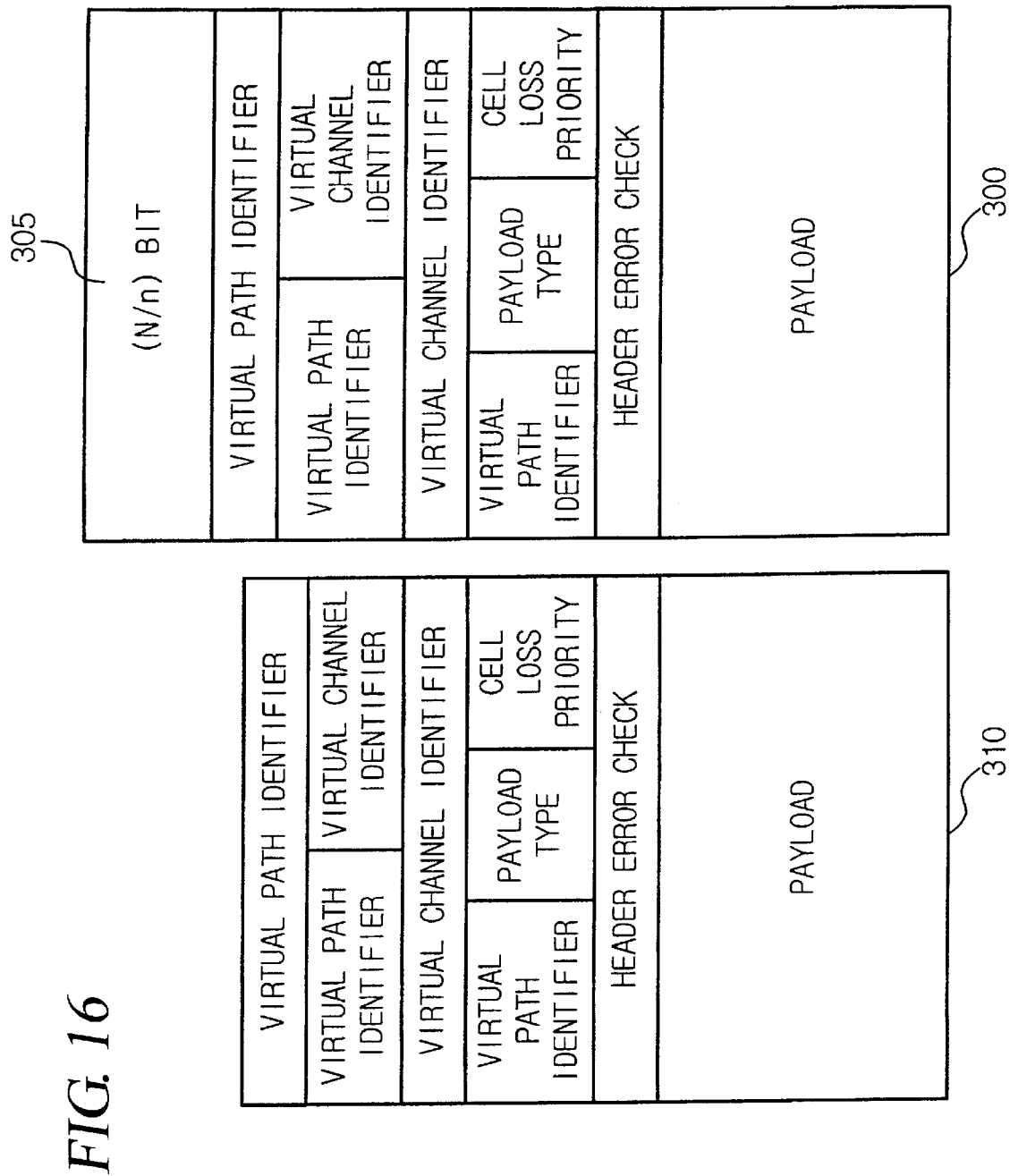
FIG. 16 illustrates a view comparing the cell-format for a large-scaled N×N switch of the present invention with a conventional cell-format.

Turn now to FIG. 16, which illustrates a view comparing the cell-format for a large-scaled N×N switch of the present invention with the conventional cell-format. FIG. 16 illustrates a new cell type 300 to transmit the cell in a large-scaled N×N switch of the present invention, compared with the conventional cell type 310. As illustrated, the large-scaled N×N switch additionally attaches a routing tag 305 at the front of the cell for cell-transmission and transmits the cell to the desirable output port by using the routing tag 305.

At this time, the number of required routing tags is a summation of N/n bits for routing in the 2n×n multiplexing switch and k bits of routing tag bits for transmitting the cell to the desirable output port in the n×n switch.

Therefore, total number of routing tag bits is N/n+k bits. And the multiplexing switch in FIG. 4 generates valid (VD) signal at the valid (VD) extracting part 230 by the method for cell-processing using the routing tag 305 of cell as illustrated in FIG. 16.

The large-scaled N×N switch implemented as shown in FIGS. 1a and 1b, when the network node interface (NNI) cell is inputted as illustrated in FIG. 16, transmits the cell to the desirable output port by a self-routing method using the routing tag 305 attached to the foremost of the cell. Here, the required number of routing tag bits is (N/n)+k, where k indicates the number of routing tag bits for n×n output switch.

Figure 17:
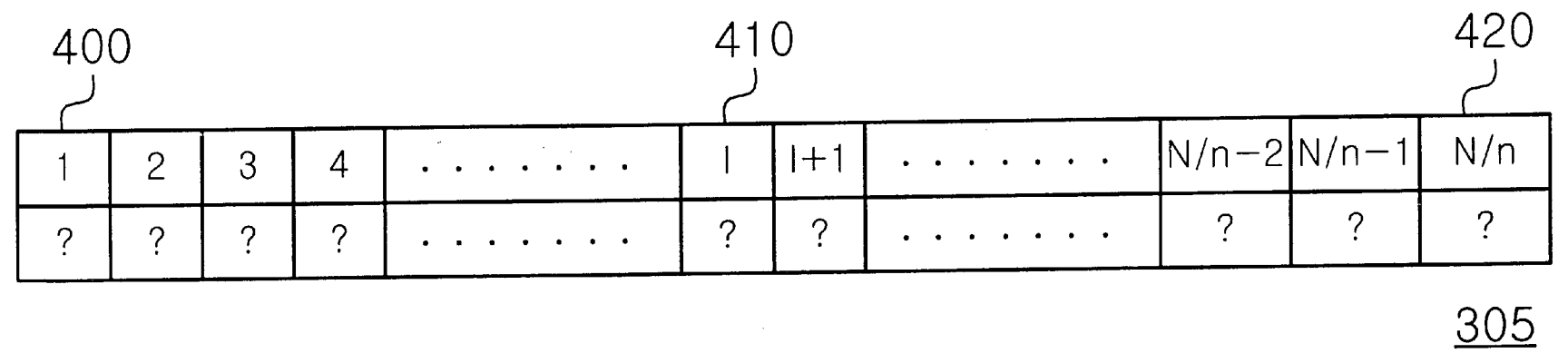

Turn now to FIG. 17, which shows the routing tag 305 that is used in the 2n×n multiplexing switch. In the large-scaled N×N switch implemented as illustrated in FIGS. 1a and 1b, the routing tag of (N/n) bits represents each output group. That is, as illustrated in FIG. 17, the first bit 400 represents the first output group, the ith bit 410 represents the ith output group ((i−1)n~in−1) and the (N/n)th bit 420 represents the (N/n)th output group (N−n~N−1) that is the last output group. And if the routing tag bit is '0', it means that the cell should be transmitted to the output group that the bit represents and if the routing tag is '1', it means that the cell is prevented from being transmitted.

Namely, if the ith routing tag is '0', it means that the cell should be transmitted to one or several output ports among the ith output group and if the ith routing tag is '1', it means that the cell is prevented from being transmitted to the output group side. At this time, a broadcasting as well as multicasting is possible by writing '0' to each of (N/n) routing tag bits that each cell can be transmitted to the desirable output group.

That is, in case of transmitting cells to all output ports, all of the routing tag bits are assigned to '0' and finally in the n×n output switch, the cells are transmitted to all output ports. For the cells to be transmitted by the 2n×n multiplexing switch having the switch architecture as illustrated in FIG. 3, they are different from each other based on the position in the large-scaled N×N switch, that is, based on the values of A and k.

The switches with the positions from $s(\log_2(N/n), 1)$ to $s(\log_2(N/n), N/2n)$ should output the cells to be outputted to the upper N/2 ports (0~N/2−1) and the switches with the positions from $s(\log_2(N/n), N/2n+1)$ to $s(\log_2(N/n), N/n)$ should output the cells to be outputted to the lower N/2 ports (N/2~N−1).

Continuously, the switches with the positions from $s(\log_2(N/n)-1, 1)$ to $s(\log_2(N/n)-1, N/4n)$ should output the cells to be outputted to the upper N/4 ports (0~N/4−1) and the switches with the positions from $s(\log_2(N/n)-1, N/4n+1)$ to $s(\log_2(N/n)-1, N/2n)$ should output the cells to be outputted to the second N/4 ports (N/4~N/2−1) to the output ports. The switches with the positions from $s(\log_2(N/n)-1, N/2n+1)$ to $s(\log_2(N/n)-1, 3N/4n)$ should output the cells to be outputted to the third N/4 ports (N/2~3N/4−1) to the output ports and the switches with the positions from $s(\log_2(N/n)-1, 3N/4n)$ to $s(\log_2(N/n)-1, N/n)$ should output the cells to be outputted to the last N/4 ports (3N/4~N−1) to the output ports.

That is, the switches with the positions from $s(A, jN/(2^Z n)+1)$ to $s(A, (j+1)N/(2^Z n))$ should output the cells to the output ports with the positions from $jN/2^Z$ to $(j+1)N/2^Z - 1$.

Here, the j and z are integers satisfying the following conditions of expression 3:

$$0 \leq j \leq 2^Z - 1, \quad Z=((\log_2(N/n))-A+1) \quad \text{[expression 3]}$$

Here again, sg(A,j) representing a switch group is defined as follows, then the switch group has one or several switches according to the stage where each switch group is positioned. The switches of each stage are divided into $2^Z((Z=((\log_2(N/n))-A+1)$ switch groups and the switch group of each stage has $N/n2^Z$ switches.

That is, the switch group sg(A,j) includes switches with the positions from $s(A,jN/(2^Zn)+1)$ to $s(A,(j+1)N/(2^Zn))$. Here, the j and z are integers satisfying the following conditions of expression 4:

$$0 \leq j \leq 2^Z - 1, \quad Z=((\log_2(N/n))-A+1) \quad \text{[expression 4]}$$

The switch group defined as described above, becomes a set of switches that should output the cells having the routing tag of equal conditions. When a cell is inputted having the routing tag bits 305 for the 2n×n multiplexing switches as illustrated in FIG. 16, the following jobs are performed to decide whether the 2n×n multiplexing switch that belongs to each switch group sg(A, j) should transmit the cells to the output ports:

(A) the cells that the 2n×n multiplexing switch, which belongs to the switch group sg(A,j), should output are the cells to be outputted to the $jN/2^Z$ to $(j+1)N/2^Z - 1$ output ports;

(B) the switch group that the ith bit of routing tag represents: (i−1)n~in−1;

(C) $(i-1)n=jN/2^Z \rightarrow i=jN/(2^Zn)+1$;

(D) $in-1=(j+1)N/(2^Zn)$; and (E) the cells that the 2n×n multiplexing switch that belongs to the switch group sg(A,j), should output are cells that the value of a bit is '0' among all the ith bits satisfying the condition of $jN/(2^Zn)+1 \leq i \leq (j+1)N/(2^Zn)$.

Therefore, if one of routing tag bits between $jN/(2^Zn)+1$ and $(j+1)N/(2^Zn)$ is '0', the 2n×n multiplexing switch that belongs to the switch group sg(A, j), transmits the cell to the output port side.

In the above description, each 2n×n multiplexing switch, s(A, k) decides whether it outputs the inputted cells in the following order:

deciding sg(A, j) that the 2n×n multiplexing switch belongs to, based on it's A and k, $$j = \lfloor((k-1)n2^Z)/N\rfloor \quad \text{[expression 5]}$$

where the function $\lfloor X \rfloor$ represents a largest integer among the integers that are less than or equal to X;

the routing tag bit which needs to be referred from the sg(A, j) decided at the above, decides the ith bits satisfying the condition of $jN/(2^Zn)+1 \leq i \leq (j+1)N/(2^Zn)$; and among the routing tags of the cells inputted, checking the bits which are decided above and if one of them is '0' then transmitting the cell.

Figure 18:
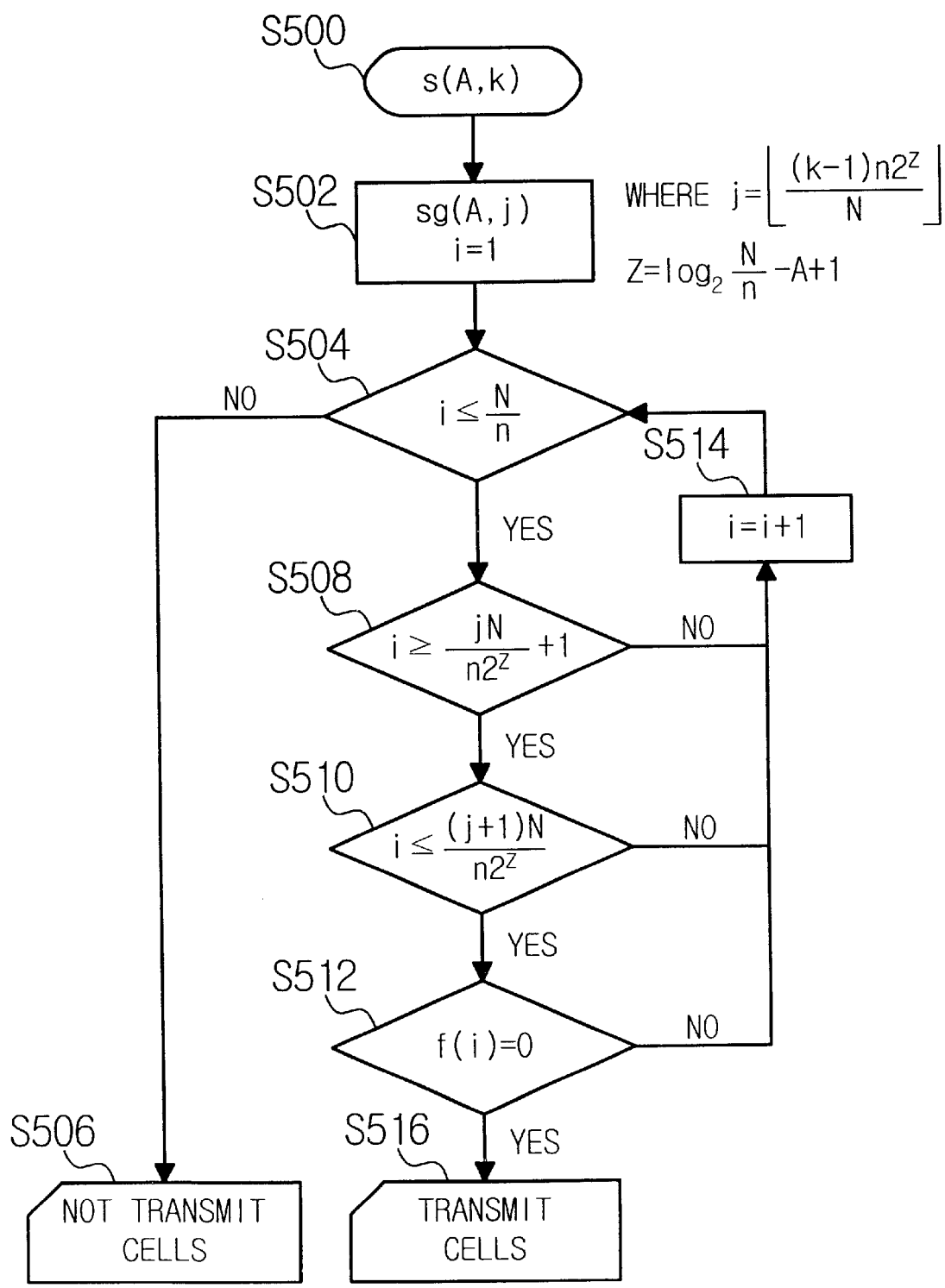
FIG. 18 illustrates a flow chart for deciding to transmit cells in the 2n×n multiplexing switching architecture, in accordance with the principles of the present invention.

Turn now FIG. 18, which illustrates a flowchart for deciding to transmit cells in the 2n×n multiplexing switching architecture, in accordance with the principles of the present invention. The flow of steps as described above is illustrated in FIG. 18. In other words, according to one embodiment of a self-routing method in a 2n×n multiplexing switch for a large-scaled fault tolerant ATM switch, as shown in FIG. 18, it is preferable that when it is provided that A indicates the stage of each switch and k indicates the kth position at each stage of n×n output switch and it is provided that $j=\lfloor((k-1)n2^Z)/N\rfloor$, where the function $\lfloor X \rfloor$ means the largest integer among the integers less than or equal to X, and $Z=((\log_2(N/n))-A+1)$, the method includes the following steps. At step S500, a decision is made as to the value of s(A,k), the switch group which a specific switch belongs to, from the values A, k of the specific switch. At step S502, a switch group sg(A,j) is defined and the value of routing tag i is initialized to 1, where $j=\lfloor((k-1)n2^Z)/N\rfloor$ and $Z=((\log_2(N/n))-A+1)$. At step S504, a determination is made as to whether the following condition is true: $i \leq [N/n]$. When step S504 results in a determination that the condition is not true, then step S506 is performed. At step S506, cells are not transmitted. When step S504 results in a determination that the condition is true, then step S508 is performed. At step S508, a determination is made as to whether the following condition is true: $i >= [((jN)/(n2^Z))+1]$. When step S508 results in a determination that the condition is not true, then step S514 is performed followed by step S504. At step S514, the value of i is incremented by 1. Alternatively, when step S508 results in a determination that the condition is true, then step S510 is performed. At step S510, a determination is made as to whether the following condition is true: $i \leq [((j+1)N)/n2^Z]$. When step S510 results in a determination that the condition is not true, then step S514 is performed followed by step S504. Alternatively, when step S510 results in a determination that the condition is true, then step S512 is performed. At step S512, a determination is made as to whether the following condition is true: f(i)=0. When step S512 results in a determination that the condition is not true, then step S514 is performed followed by step S504. Alternatively, when step S512 results in a determination that the condition is true, then step S516 is performed. At step S516, cells are transmitted.

If the cells are routed in the 2n×n multiplexing switch as illustrated in FIG. 4 by using the routing tag according to the above method, each cell is transmitted to the desirable n×n output switch. And in the n×n output switch, the cells are transmitted to the last output port by using the routing tag bits of k bits.

At this time, the self-routing method in the n×n output switch can be different depending on the type of switch used.

At the above, a cell-transmission method in the 2n×n multiplexing switch and description for the architecture of the 2n×n multiplexing switch is followed.

As illustrated in FIG. 4, the 2n×n multiplexing switch includes valid (VD) extracting part 230, FIFO buffer 250, shared FIFO buffer 245, outputting part 260, fault detector 210 and back pressure generating part 200. In the valid (VD) extracting part 230, the cell inputted is passed through the 2n×n multiplexing switch and it is decided whether the cell is to be transmitted. When the cell is to be transmitted, the valid (VD) signal is set to '0' and when it is not to be transmitted, valid (VD) signal is set to '1' so that the FIFO selecting part and the fault detector can use it. That is, the valid (VD) extracting part functions of generating the valid (VD) signal by processing the routing tag of the cell according to the flow chart as illustrated in FIG. 18.

The FIFO selecting part 240 selects a FIFO buffer 250 where each cell is to be stored referring to the 2n cells $(I_0 \sim I_{2n-1})$ transmitted through 2n valid (VD) extracting part and each valid (VD) bit $(VD_0 \sim VD_{2n-1})$, and transmits the cells to the corresponding FIFO buffer side.

Figure 5:
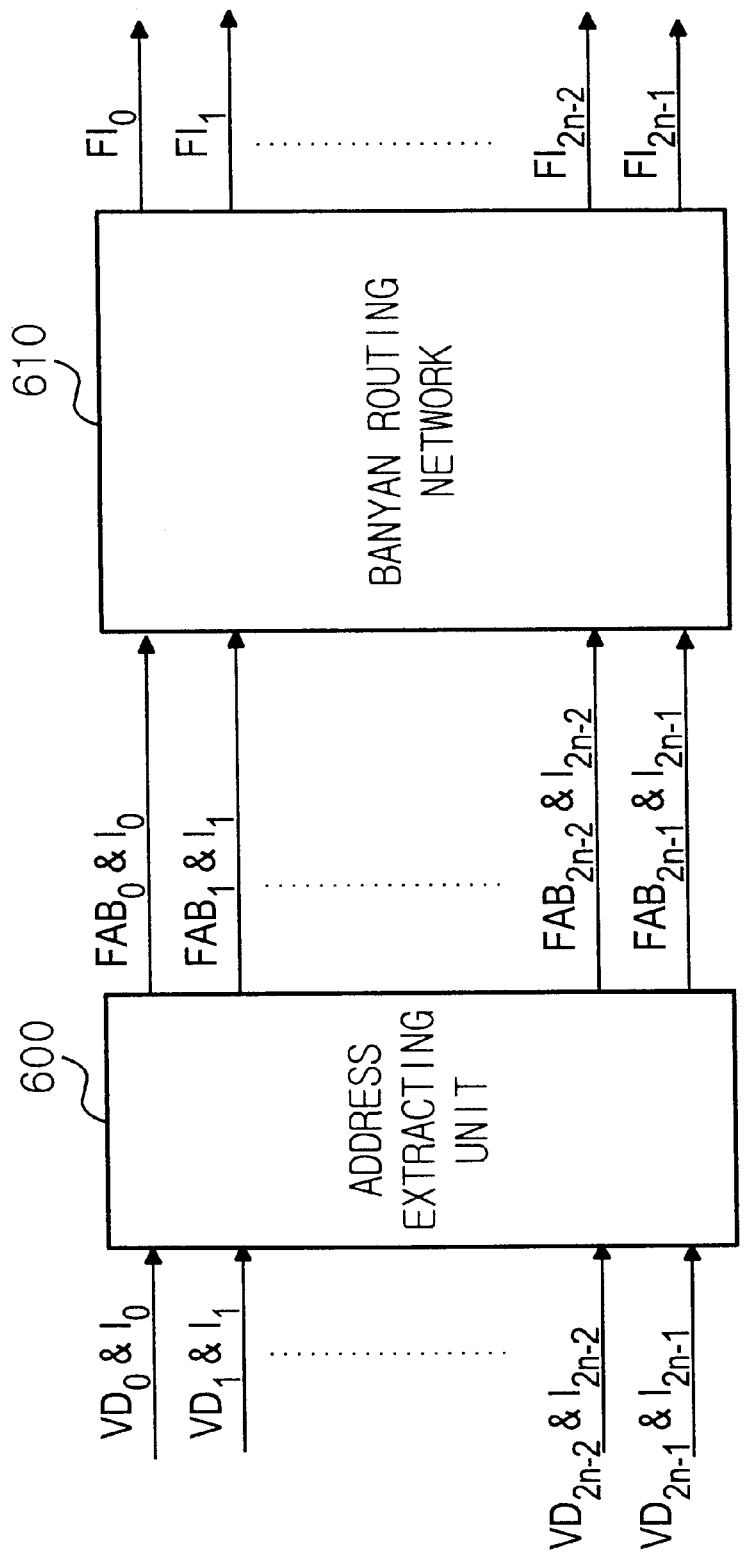
FIG. 5 illustrates the structure of the first in first out (FIFO) selecting part of FIG. 4, in accordance with the principles of the present invention.

Turn now to FIG. 5, which illustrates the structure of the FIFO selecting part of FIG. 4, in accordance with the principles of the present invention. FIG. 5 illustrates a fundamental structure of the FIFO selecting part 240. The FIFO selecting part 240 includes FIFO address extracting part 600 and Banyan routing network 610.

Figure 6:
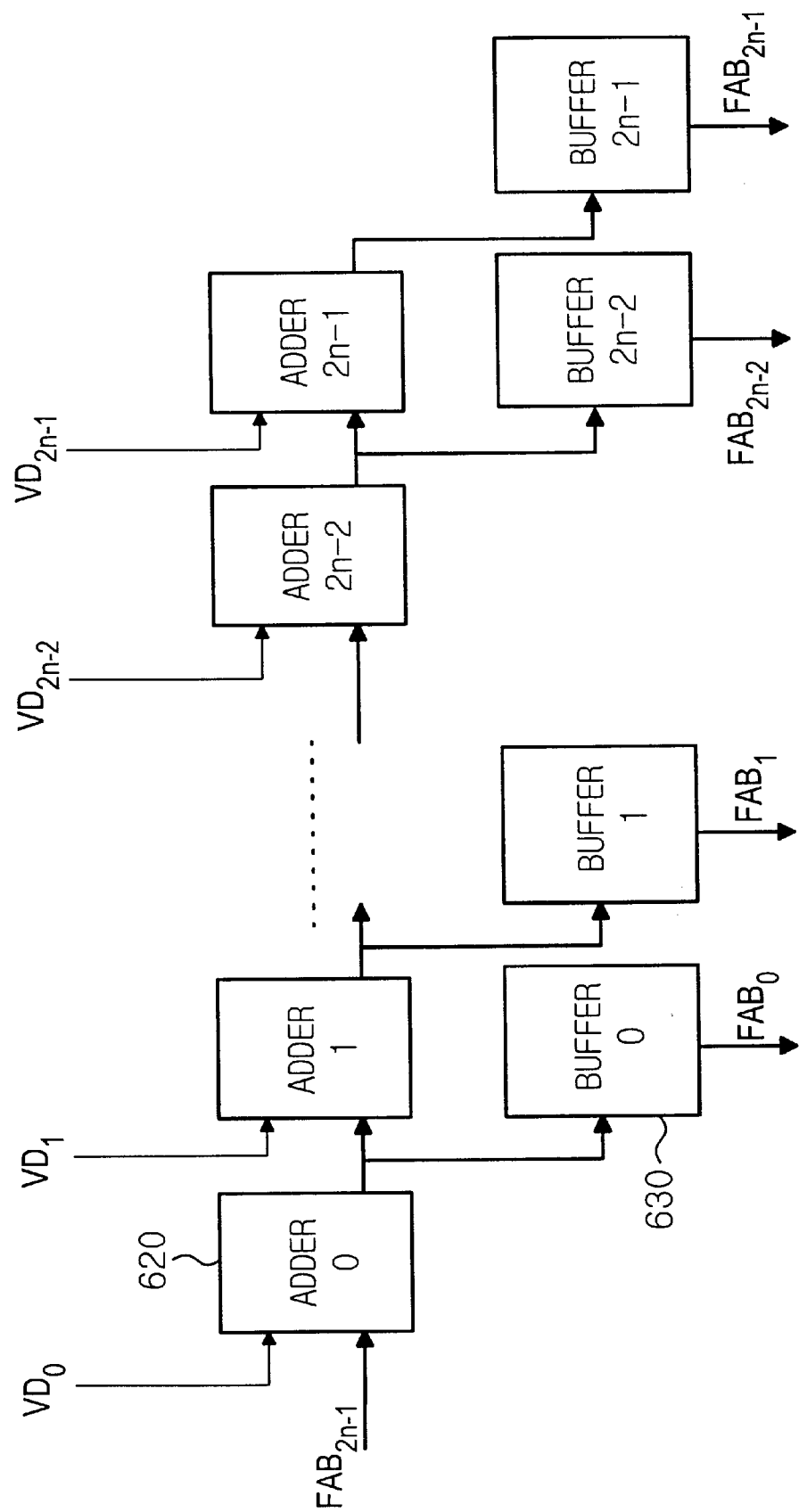
FIG. 6 illustrates the structure of the first in first out (FIFO) address extracting part of the FIG. 5, in accordance with the principles of the present invention.

Turn now to FIG. 6, which illustrates the structure of the FIFO (600) address extracting part of FIG. 5, in accordance with the principles of the present invention. FIG. 6 illustrates a structure of the FIFO address extracting part 600. The FIFO address extracting part 600 includes 2n adders 620 and buffers 630.

If the $VD_0$ is '0', the adder 0 adds 1 to the FIFO buffer number that is finally read at the previous time interval, and if it is '1', adds '0' to that and then transmits the sum to the next adder and buffer. If $VD_i$ is '0', the adder i adds '1' to the sum at the (i−1)th adder and if $VD_i$ is '1', the adder i adds '0' to that and then transmits the sum to the next adder and buffer.

The value ($FAB_0$~$FAB_{2n-1}$) stored in the buffer, indicates the FIFO buffer number where each cell should be stored and also indicates the routing tag used in the rear Banyan routing network 610. The Banyan routing network 610 functions in that it transmits, the cells to the desirable FIFO buffer by using the FAB of each cell.

Figure 7:
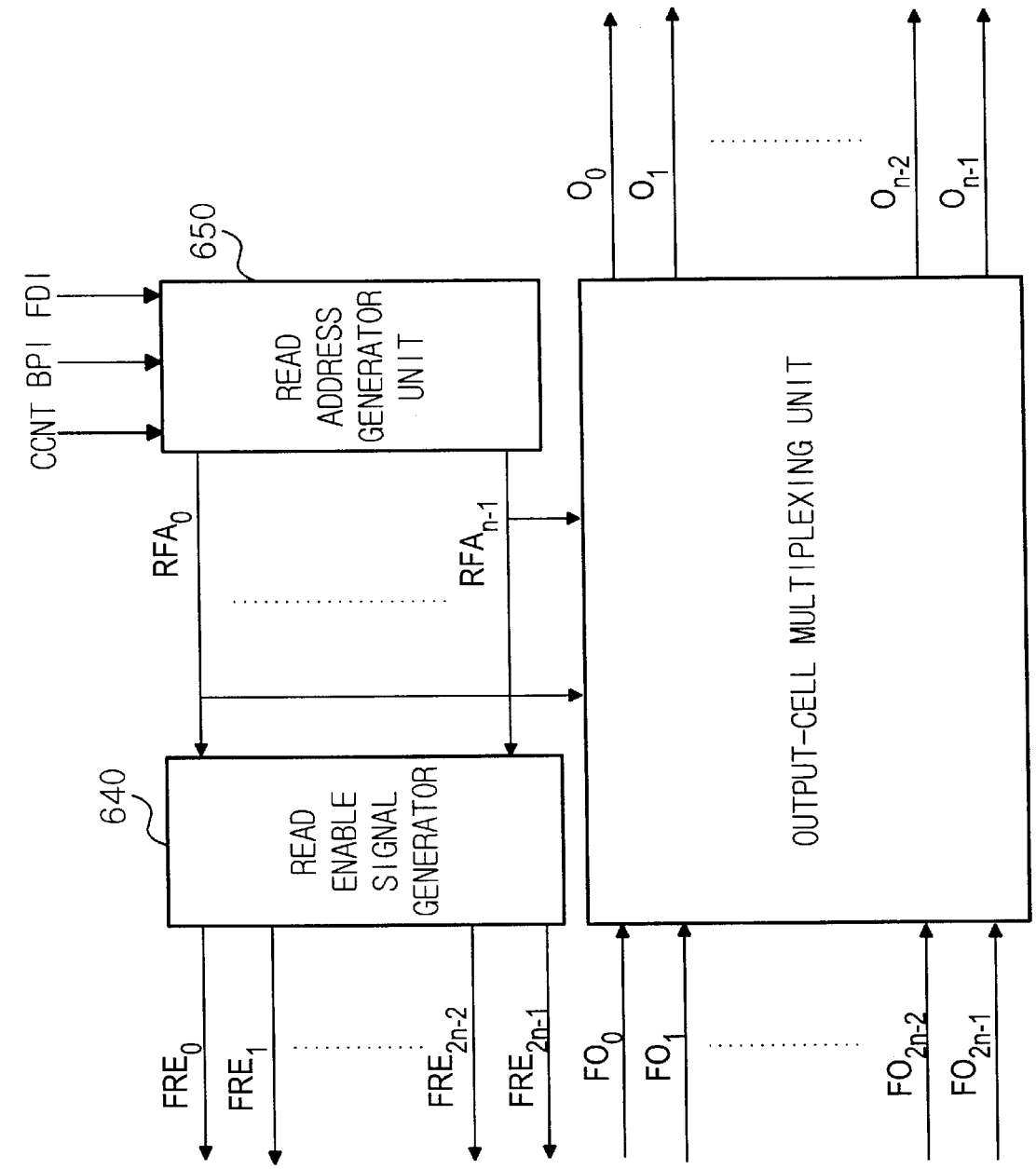
FIG. 7 illustrates the structure of outputting part of the FIG. 4, in accordance with the principles of the present invention.

Turn now to FIG. 7, which illustrates the structure of outputting part 260 of FIG. 4, in accordance with the principles of the present invention. In FIG. 7, The outputting part 260 reads the cells, which are stored in the shared FIFO buffer 245, up to the maximum n cells and transmits the cells to the output port. The outputting part 260 includes FIFO read enable (hereafter abbreviated as FRE) generator 640, read FIFO address (hereafter abbreviated as RFA) generator 650 and output cell multiplexing part 660.

Figure 8:
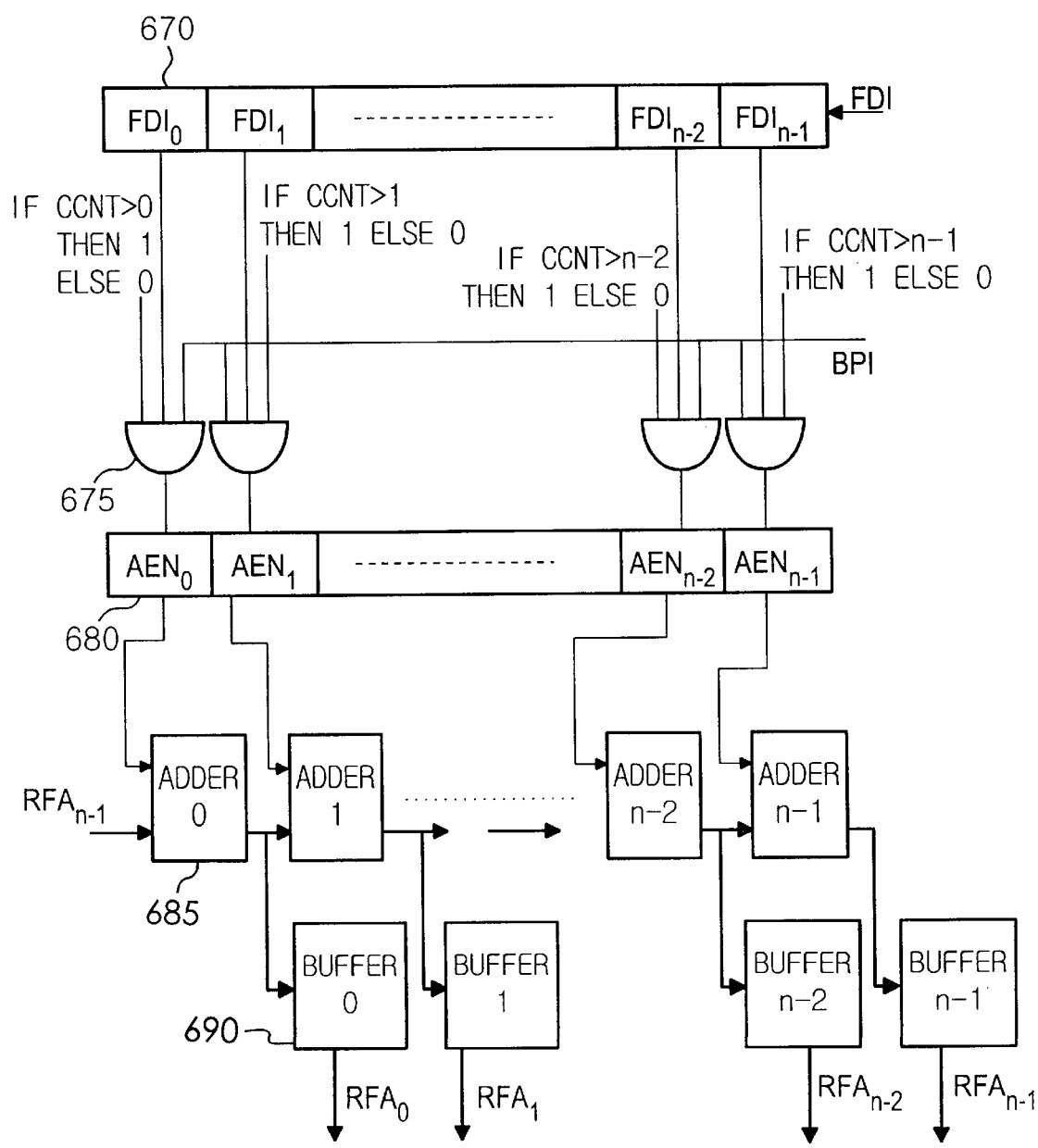
FIG. 8 illustrates the structure of the read FIFO address (RFA) generator of the FIG. 7, in accordance with the principles of the present invention.

Turn now to FIG. 8, which illustrates the structure of the RFA generator 650 of FIG. 7, in accordance with the principles of the present invention. In FIG. 8, there is a view of circuit for the read FIFO address (RFA) generator 650 of the outputting part 260 and the read FIFO address (RFA) generator n adders and buffers. In each buffer, the FIFO address to be read is stored. If the $AEN_0$ is '0', the adder 0 adds 1 to the FIFO address that is finally read at the previous time interval, and if it is '1', adds '0' to that. The result of sum is transmitted to the buffer 0 and the adder 1 simultaneously. If $AEN_i$ is '0', the adder i adds '1' to the result of sum from the adder of the former stage and if not, the adder i adds '0' to that. And the result of sum is stored in the buffer i.

The AEN 680 is regarded as a signal to operate the adder every time interval. This signal includes back pressure signal inputted from the latter stage, fault detection indicator (FDI) 670 and the cell count (CCNT) that indicates the number of cells stored in the cell counter, as illustrated in FIG. 8.

FIG. 8 also shows AND logic gates 675 receiving the back pressure input (BPI) signal. The AEN 680 is an adder enable signal 680. The AEN signal 680 is generated from back pressure input (BPI) inputted from the next stage, fault detection input (FDI) and the cell count (CCNT) that indicates the number of cells stored in the cell counter.

Figure 9:
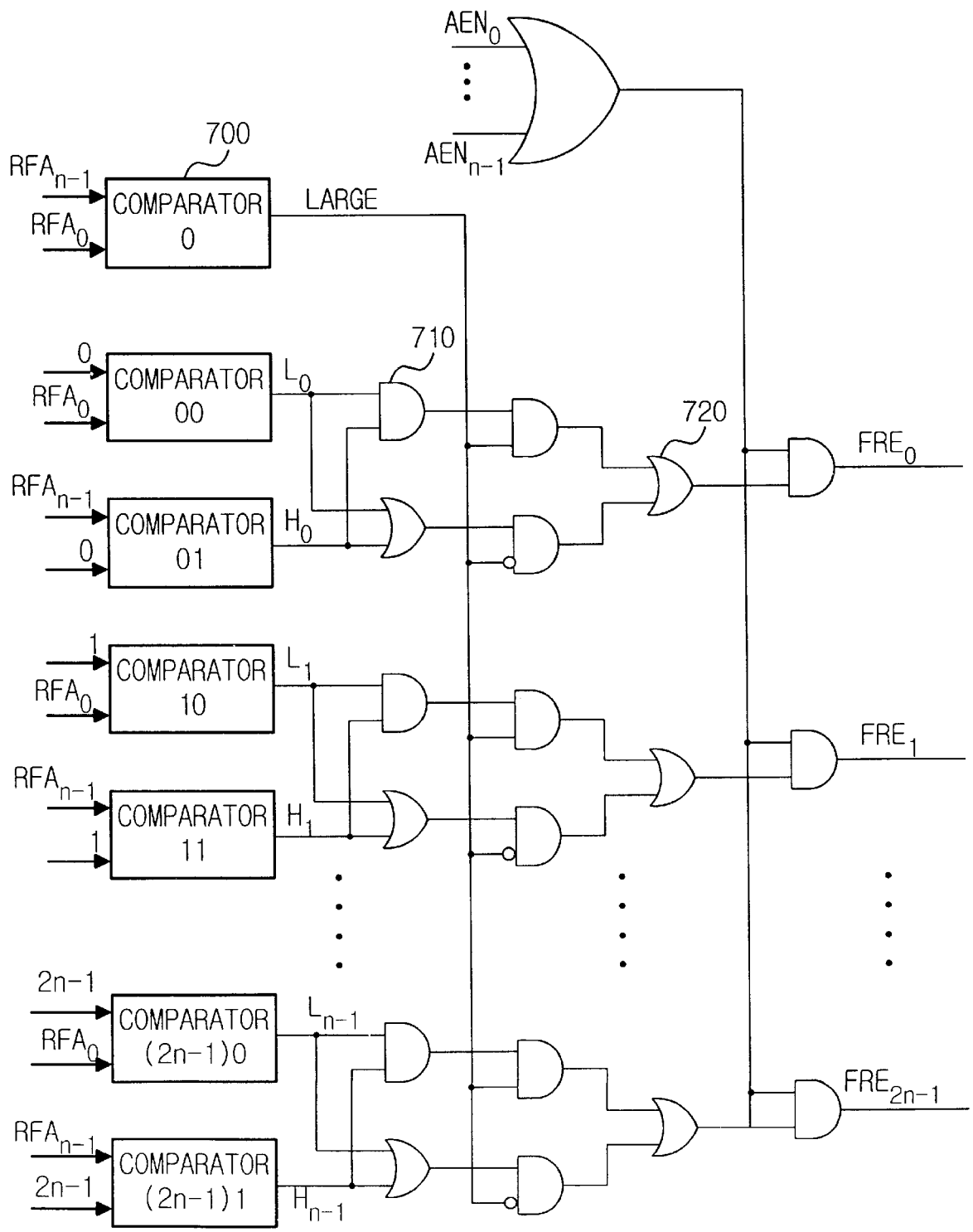
FIG. 9 illustrates the structure of the FIFO read enable (FRE) generator of the FIG. 7, in accordance with the principles of the present invention.

Turn now to FIG. 9, which shows the structure of the FRE generator 640 of FIG. 7, in accordance with the principles of the present invention. The FIFO read enable (FRE) generator 640 generates FIFO read enable (FRE) signal using the read FIFO address (RFA) that is made in the read FIFO address (RFA) generator 650 and it includes AND gates and OR gates as illustrated in FIG. 9. In FIG. 9 there are a plurality of comparators 700, AND gates 710, and OR gates 720. The comparator 0 compares $RFA_0$ with $RFA_{n-1}$. If $RFA_{n-1}$ is greater than $RFA_0$, the comparator 0 outputs '1' and if $RFA_{n-1}$ is less than or equal to $RFA_0$, it outputs '0'.

And each $RFE_k$ has a result of logical AND operation with results of comparator $k_0$ and comparator $k_1(L_k, H_k)$ if the result of comparator 0 is '1' and it has a result of logical OR operation with results of comparator $k_0$ and comparator $k_1(L_k, H_k)$ if the result of comparator 0 is '0'. And if the $RFE_k$ is '1', a cell is read from the kth FIFO buffer and if it is '0', a cell is not read from the corresponding FIFO buffer and $FO_k$ is made as a dummy cell.

Figure 10:
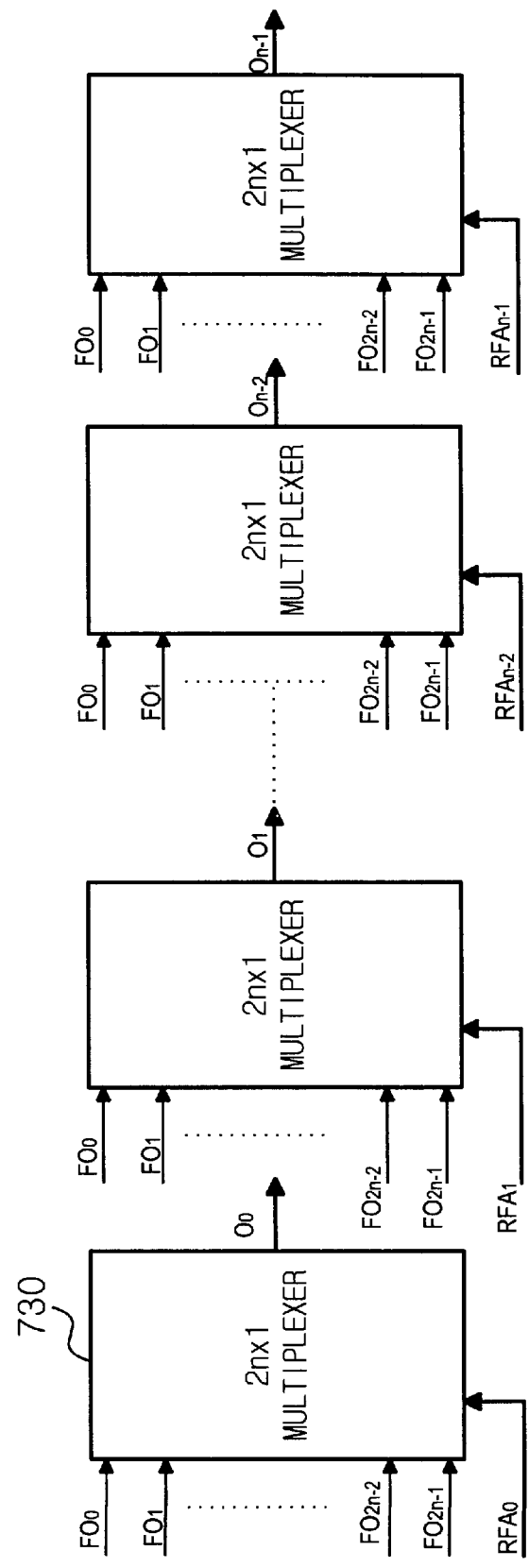
FIG. 10 illustrates the structure of the output-cell multiplexing part of FIG. 7, in accordance with the principles of the present invention.

Turn now to FIG. 10, which shows the structure of the output-cell multiplexing part 660 of FIG. 7, in accordance with the principles of the present invention. FIG. 10 shows a plurality of multiplexers 730. The cells read as the above ($FO_0$~$FO_{2n-1}$) are transmitted to the output cell multiplexing part. The output cell multiplexing part in FIG. 10 selects one of cells ($FO_0$~$FO_{2n-1}$) which have been read using the read FIFO address (RFA) generated in the read FIFO address (RFA) generator 650. Namely, the output port 0 selects the Xth $FO_x$ cell according to the $RFA_0$, 'X'.

Figure 11:
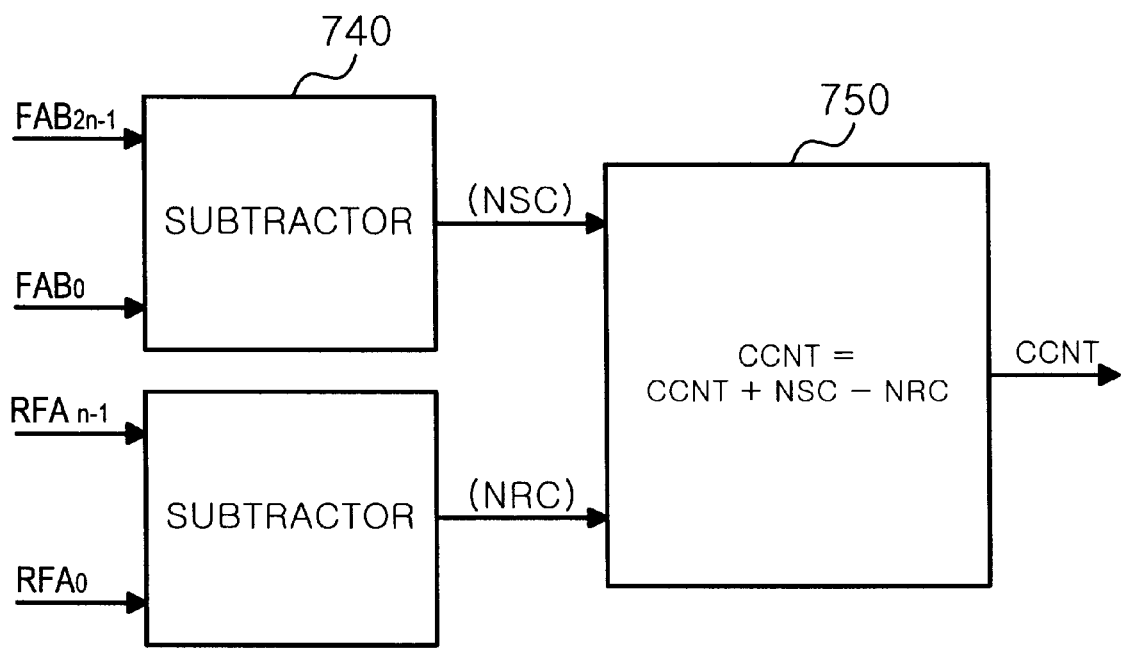
FIG. 11 illustrates the structure of the cell counter of the FIG. 4, in accordance with the principles of the present invention.

Turn now to FIG. 11, which shows the structure of cell counter 220 of FIG. 4, in accordance with the principles of the present invention. The cell counter 220 of FIG. 4 is a part that writes the number of cells stored in the present shared FIFO buffer 245. It includes two subtractors 740 and an adder-subtractor 750 as illustrated in FIG. 11. The two subtractors 740 are used to calculate the number of cells to be newly stored (NSC) and the number of cells to be newly read (NRC) at this time interval. Newly stored cells (NSC) and newly read cells (NRC) are shown in FIG. 11. The adder-subtractor 750 adds the NSC to the CCNT stored in the shared FIFO buffer before a time interval and subtracts the NRC from the CCNT to finally calculate the number of cells stored in the shared FIFO buffer at this time interval.

Figure 12:
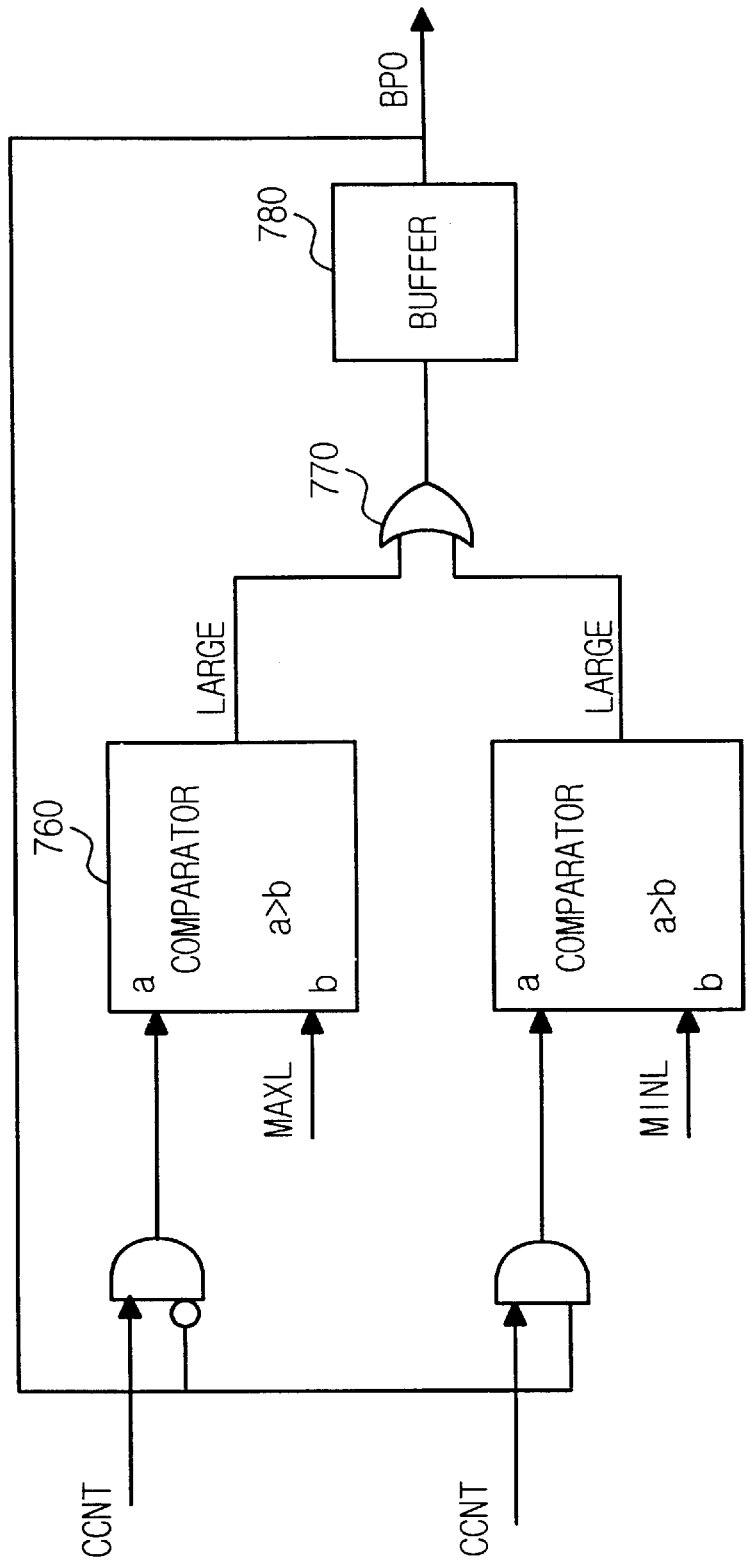
FIG. 12 illustrates the structure of the back pressure signal generator of FIG. 4, in accordance with the principles of the present invention.

Turn now to FIG. 12, which illustrates the structure of the back pressure signal generator 200 of FIG. 4, in accordance with the principles of the present invention. FIG. 12 shows a view of the circuit for the back pressure signal generator 200. The back pressure signal generator 200 functions to generate the signal (BPO) that prevents the more cells from being transmitted to the switches of the previous stage. If the number of cells in the present switch becomes greater than the maximum value (MaxL), the generator generates the BPO signal so that the switches of the previous stage can not transmit cells. If the number of cells is reduced after generating the BPO and it becomes less than or equal to the minimum value (MinL), generating the BPO signals is stopped. FIG. 12 includes two comparators 760, an OR gate 770, and a buffer 780.

Figure 13:
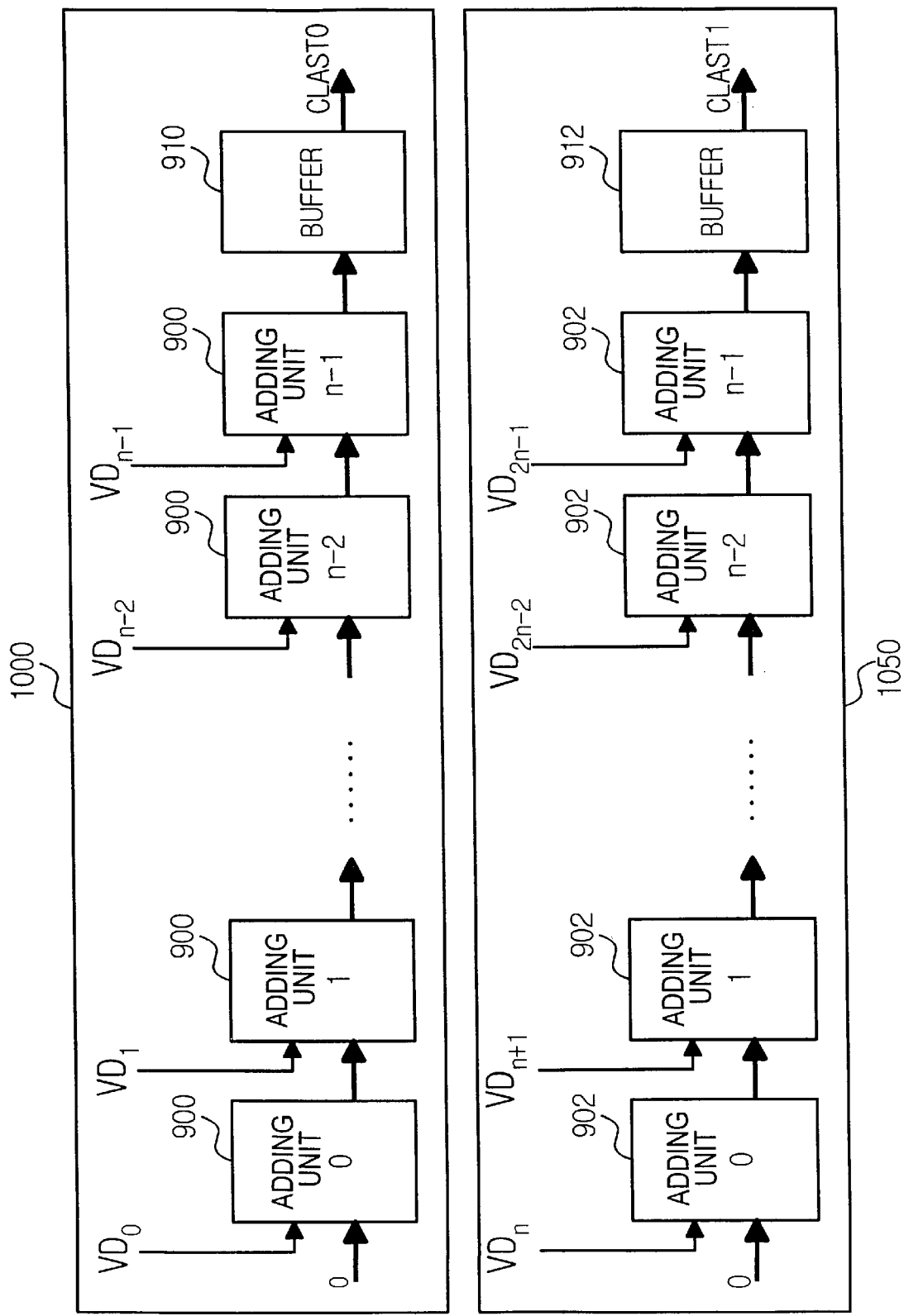
FIG. 13 illustrates the structure of a CLAST generator, in accordance with the principles of the present invention.
Figure 14:
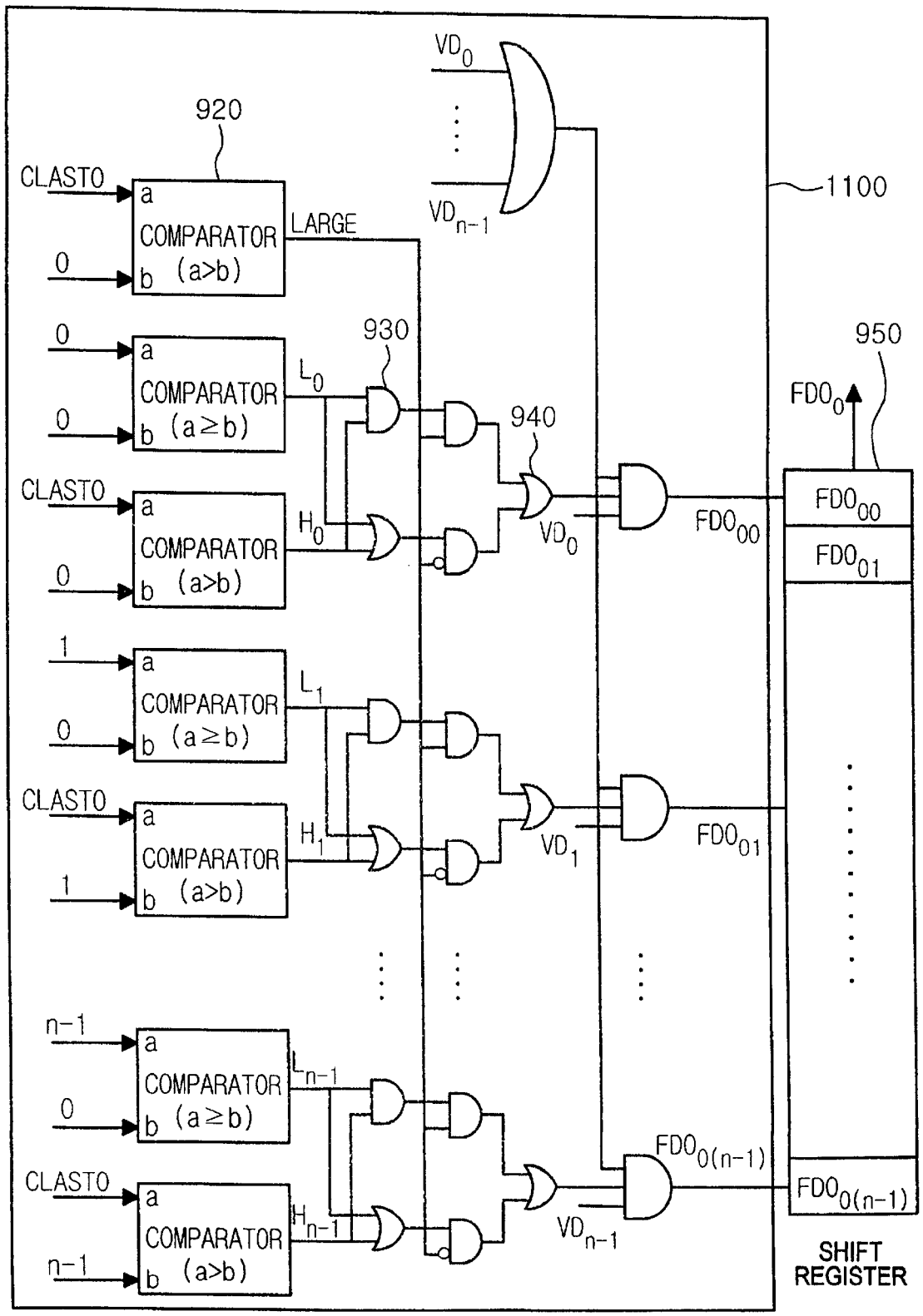
FIG. 14 illustrates the structure of the $FDO_0$ of the fault detector shown in FIG. 4, in accordance with the principles of the present invention.
Figure 15:
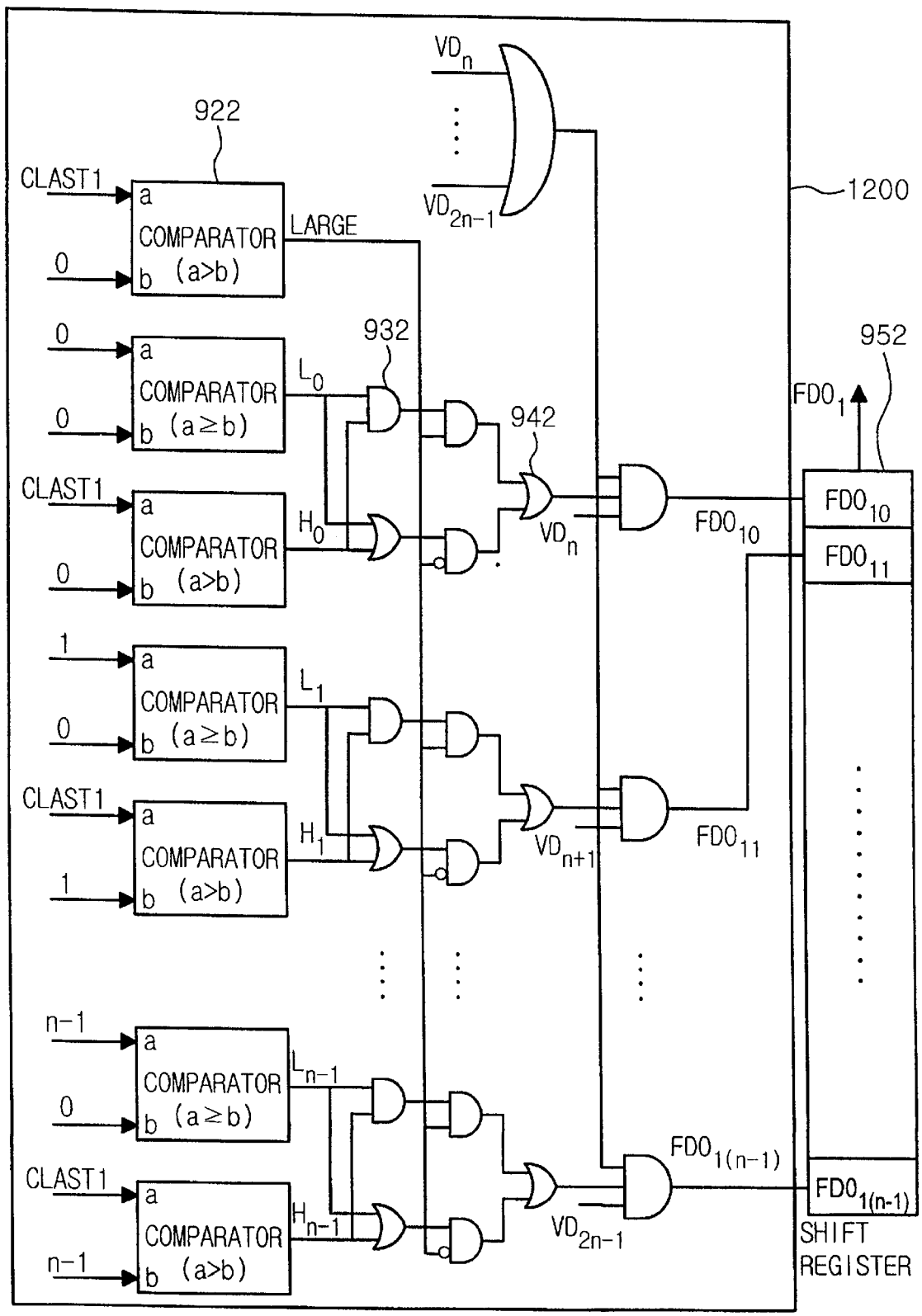
FIG. 15 illustrates the structure of the $FDO_1$ of the fault detector shown in FIG. 4, in accordance with the principles of the present invention.

Turn now to FIGS. 13 through 15. FIGS. 13 through 15 illustrate views of circuits for the fault detector 210 of FIG. 4 to detect faults of input ports. FIG. 13 illustrates a plurality of adders 900 a buffer 910 included in a CLAST signal generator 1000. FIG. 14 includes a plurality of comparators 920, AND gates 930, OR gates 940, and a shift register 950. FIG. 14 illustrates a fault signal generator 1100. Note that FIG. 15 includes a plurality of comparators 922, AND logic gates 932, OR logic gates 942, and a shift register 952. FIG. 15 illustrates a fault signal generator 1200. The 2n×n multiplexing switch transmits cells to each port of output stage usually from port 0 sequentially. And each port is connected through the 2n×n multiplexing switch, so the valid (VD) signal generated in the valid (VD) extracting part should be also generated from port 0 and port 16 sequentially. Therefore, if '0' exists among '1's when the valid (VD) signals are arranged per port, the port is regarded as a fault. By using that, the fault signal of each port of input stage, FDO is generated through the views of structure from FIGS. 13 through 15.

By the architecture as stated above, it is possible to perform multicasting and broadcasting through the implementation of a large-scaled switch according to the present invention. Also, as the maximum capacity of the switch to be implemented on a board is restricted, so it is possible to simply make the large-scaled switch by using the restricted capacity of switch and it is possible to transmit the cells simply and quickly by using the self-routing method.

In addition, it is possible to improve the performance of switch by using an output buffer type switch as a multiplexing switch with the switch architecture according to the present invention. And if the prior method for implementing the switch that has already been filed is added by the function of generating the back pressure signals, it is possible to detect a fault which occurs between the output stage and the input stage of each switch and to prevent the cells from being transmitted to the port. In result, it can considerably reduce the cell loss probability. Also, the implementation of a 2n×n multiplexing switch according to the present invention is by far simple.

The foregoing paragraphs describe the details of a large-scaled fault tolerant asynchronous transfer mode (ATM) switch and a method for implementing a large-scaled ATM switch by using 2n×n multiplexing switch having a large-scaled fault tolerant ATM switch architecture, a fault detector and a back-pressure signal generator and by using n×n output switch.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An asynchronous transfer mode (ATM) switch having a starting stage consisting of a plurality of output switches, and a plurality of primary stages, each of said plurality of primary stages consisting of a plurality of multiplexing switch units, each of said multiplexing switch units consisting of a multiplexing apparatus and a copier, each of said plurality of primary stages receiving a plurality of data cells from a stage positioned just ahead of each of said plurality of primary stages, a last stage receiving data cells externally from said ATM switch, said last stage being leftmost stage of said plurality of primary stages, a first stage being rightmost stage of said plurality of primary stages, said starting stage receiving outputs of said first stage, said copier receiving outputs of said multiplexing apparatus and copying said outputs and outputting said received outputs and said copied outputs, said multiplexing apparatus comprising:

a generating unit, consisting of a plurality of extracting parts, receiving a plurality of data cells from among said data cells, generating control signals corresponding to said plurality of data cells, and outputting said data cells and said control signals, said generating of said control signals being in accordance with routing tags in said received data cells;

a shared FIFO buffer, said shared FIFO buffer having a plurality of buffer units;

a buffer selecting unit, receiving said data cells and said control signals from said generating unit, selecting buffer units from said plurality of buffer units in accordance with said control signals, and transmitting said data cells to said selected buffer units;

an outputting unit transmitting data cells stored in said selected buffer units;

a cell counting unit receiving first counting data from said buffer selecting unit, receiving second counting data from said outputting unit, counting a quantity of data cells stored in said plurality of buffer units by using said first and second counting data transmitted from said buffer selecting unit and outputting unit, and transmitting a counting signal corresponding to said quantity of data cells to said outputting unit;

a back-pressure signal generating unit receiving said counting signal from said cell counting unit, and generating back-pressure signals corresponding to said counting signal; and a fault detecting unit receiving said control signals from said generating unit, and detecting faults from among said plurality of data cells, wherein said plurality of data cells received by said generating unit corresponds to a number of data cells equal to a first integer, said plurality of data cells transmitted by said outputting unit corresponds to a number of data cells equal to a second integer, said second integer being equal to a number resulting from said first integer being divided by two.

2. The ATM switch of claim 1, wherein said buffer selecting unit further comprises:

an address extracting unit generating addresses of said selected buffer units; and a Banyan routing network transmitting said selected data cells to said selected buffer units in accordance with said addresses generated in said address extracting unit.

3. The ATM switch of claim 2, wherein said address extracting unit further comprises:

a plurality of adders being interconnected in series each respective adder of said plurality of adders performing a respective adding operation upon a respective control signal corresponding to said respective adder and an output of a previous adder positioned upstream of said respective adder, and then sending a result of said respective adding operation to a next adder positioned downstream of said respective adder, wherein a first-positioned adder performs a first-position adding operation upon an output received from a last-positioned adder positioned upstream of said first-positioned adder and a control signal corresponding to said first-posited adder, and then sends a result of said first-position adding operation to a next adder positioned downstream of said first-positioned adder, said first-positioned adder, said last-positioned adder, and said next adder being among said plurality of adders; and a plurality of buffers, each respective buffer of said plurality of buffers receiving a respective result of a respective adding operation of each respective adder.

4. The ATM switch of claim 1, wherein said outputting unit further comprises:

a read address generator unit generating read signals, said read signals corresponding to said selected buffer units said read address generator reading and transmitting data cells stored in said selected buffer units, output data stored in said selected buffer units being read and transmitted;

a read enable signal generator generating read enable signals in accordance with said read signals; and an output-cell multiplexing unit transmitting said data cells from said selected buffer units in accordance with said read signals.

5. The ATM switch of claim 4, wherein said read address generator unit further comprises:

a shift register transmitting a plurality of fault detection signals sequentially, said plurality of fault detection signals corresponding to a number equal to said first integer;

a plurality of AND-gates, each respective AND-gate of said plurality of AND-gates receiving a respective fault detection signal selected from among said plurality of fault detection signals from said shift register and receiving a respective decision signal corresponding to said counting signal received from said cell counting unit and receiving said back-pressure signals, each respective AND-gate performing a logical AND-operation on said respective fault detection signal, said respective decision signal, and said back-pressure signal and each respective AND-gate transmitting a respective result of said logical AND operation;

a register receiving said respective result of said logical AND operation from each of said plurality of AND-gates simultaneously and said register transmitting a plurality of register signals corresponding to said respective result received from each of said plurality of AND-gates;

a plurality of adders being interconnected in series, each respective adder of said plurality of adders performing a respective adding operation upon a respective AEN signal corresponding to said respective adder and an output of a previous adder positioned upstream of said respective adder, and then sending a result of said respective adding operation to a next adder positioned downstream of said respective adder, wherein a first-positioned adder performs a first-position adding operation upon an output received from a last-positioned adder positioned upstream of said first-positioned adder and a control signal corresponding to said first-positioned adder, and then sends a result of said first-position adding operation to a next adder positioned downstream of said first-positioned adder, said first-positioned adder, said last-positioned adder and said next adder being among said plurality of adders; and a plurality of buffers each respective buffer of said plurality of buffers receiving a respective result of a respective adding operation of each respective adder corresponding to said each respective buffer.

6. The ATM switch of claim 1, wherein said fault detecting unit further comprises:

two CLAST signal generators, each respective CLAST signal generator of said two CLAST signal generators receiving said control signals from said Generating unit and a generating CLAST signal;

two fault signal generators, each respective fault signal generator of said two fault signal generators receiving said CLAST signal and generating fault signals, and two shift registers, each respective shift register of said two shift registers receiving said fault signals in parallel and shifting said fault signals.

7. The ATM switch of claim 4, wherein said output cell multiplexing unit comprises a plurality of multiplexers, said plurality of multiplexers corresponding to a number equal to n, each one of said plurality of multiplexers having one output terminal and a plurality of input terminals, said plurality of input terminals corresponding to a number equal to (2n), wherein n corresponds to said first integer.

8. The ATM switch of claim 1, wherein said plurality of data cells corresponds to a number of data cells equal to said second integer.

9. The ATM switch of claim 8, wherein said plurality of data cells is inputted to said generating unit every cell period.

10. The ATM switch of claim 1, wherein said plurality of buffer units corresponds to said second integer.

11. The ATM switch of claim 3, wherein said plurality of adders corresponds to a number of adders equal to said second integer.

12. The ATM switch of claim 3, wherein said plurality of buffers corresponds to a number of buffers equal to said second integer.

13. The ATM switch of claim 4, wherein said read signals correspond to a plurality of read signals, said plurality of read signals further corresponding to a number of read signals equal to said first integer.

14. The ATM switch of claim 4, wherein said read enable signals correspond to a plurality of read enable signals, and said plurality of read enable signals further corresponds to a number of read enable signals equal to said second integer.

15. The ATM switch of claim 4, wherein said output-cell multiplexing unit transmits a number of output data cells corresponding to said first integer, said number of output data cells being transmitted to a next stage, said next stage being positioned downstream of each of said plurality of stages, and said number of output data cells being selected from among said plurality of data cells stored in said plurality of buffer units.

16. The ATM switch of claim 5, wherein said plurality of adders corresponds to a number of adders equal to said first integer.

17. The ATM switch of claim 5, wherein said plurality of buffers corresponds to a number of buffers equal to said first integer.

18. The ATM switch of claim 13, wherein said read enable signal generator unit further comprises:

a plurality of comparators receiving said plurality of read signals from said read address generator unit, said plurality of comparators corresponding to a number equal to (4n+1), wherein n corresponds to said first integer;

a plurality of logical AND-gates, said plurality of logical AND-gates corresponding to a number equal to (8n), wherein n corresponds to said first integer; and a plurality of logical OR-gates, said plurality of logical OR-gates corresponding to a number equal to (4n+1), wherein n corresponds to said first integer.

19. An asynchronous transfer mode (ATM) switch having a starting stage consisting of a plurality of output switches and a plurality of primary stages, each of said plurality of primary stages consisting of a plurality of multiplexing switch units each of said multiplexing switch units consisting of a multiplexing apparatus and a copier, each of said plurality of primary stages receiving a plurality of data cells from a stage positioned just ahead of each of said plurality of primary stages, a last stage receiving data cells externally from said ATM switch, said last stage being leftmost stage of said plurality of primary stages, a first stage being rightmost stage of said plurality of primary stages, said starting stage receiving outputs of said first stage, said copier receiving outputs of said multiplexing apparatus and copying said outputs and outputting said received outputs and said copied outputs, said multiplexing apparatus comprising:

- a generating unit, consisting of a plurality of extracting parts, receiving a plurality of data cells from among said data cells, generating control signals corresponding to said plurality of data cells, and outputting said data cells and said control signals, said generating of said control signals being in accordance with routing tags in said received data cells;
- a shared FIFO buffer, said shared FIFO buffer having a plurality of buffer units;
- a buffer selecting unit, receiving said data cells and said control signals from said generating unit, selecting buffer units from said plurality of buffer units in accordance with said control signals, and transmitting said data cells to said selected buffer units:
- an outputting unit transmitting data cells stored in said selected buffer units;
- a cell counting unit receiving first counting data from said buffer selecting unit, receiving second counting data from said outputting unit, counting a quantity of data cells stored in said plurality of buffer units by using said first and second counting data transmitted from said buffer selecting unit and outputting unit, and transmitting a counting signal corresponding to said quantity of data cells to said outputting unit;
- a back-pressure signal generating unit receiving said counting signal from said cell counting unit, and generating back-pressure signals corresponding to said counting signal; and
- a fault detecting unit receiving said control signals from said generating unit and detecting faults from among said plurality of data cells.

20. The ATM switch of claim 1, wherein said control signals generated by said generating unit corresponds to valid (VD) signals.

21. The ATM switch of claim 19, wherein said buffer units correspond to storing units receiving, storing and transmitting a plurality of data signals in accordance with a first-in-first-out sequential structure.

22. The ATM switch of claim 21, wherein said data signals correspond to said data cells.

23. An asynchronous transfer mode (ATM) switch having a starting stage consisting of a plurality of output switches, and a plurality of primary stages, each of said plurality of primary stages consisting of a plurality of multiplexing switch units, each of said multiplexing switch units consisting of a multiplexing apparatus and a copier, each of said plurality of primary stages receiving a plurality of data cells from a stage positioned just ahead of each of said plurality of primary stages, a last stage receiving data cells externally from said ATM switch, said last stage being leftmost stage of said plurality of primary stages, a first stage being rightmost stage of said plurality of primary stages, said starting stage receiving outputs of said first stage, said copier receiving outputs of said multiplexing apparatus and copying said outputs and outputting said received outputs and said copied outputs, said multiplexing apparatus comprising:

- a generating unit, consisting of a plurality of extracting parts, receiving a plurality of data cells from among said data cells, generating control signals corresponding to said plurality of data cells, and outputting said data cells and said control signals, said generating of said control signals being in accordance with routing tags in said received data cells;
- a shared FIFO buffer, said shared FIFO buffer having a plurality of buffer units;
- a buffer selecting unit, receiving said data cells and said control signals from said generating unit, selecting buffer units from said plurality of buffer units in accordance with said control signals, and transmitting said data cells to said selected buffer units;
- an outputting unit transmitting data cells stored in said selected buffer units;
- a cell counting unit receiving first counting data from said buffer selecting unit, receiving second counting data from said outputting unit, counting a quantity of data cells stored in said plurality of buffer units by using said first and second counting data transmitted from said buffer selecting unit and outputting unit, and transmitting a counting signal corresponding to said quantity of data cells to said outputting unit;
- a back-pressure signal generating unit receiving said counting signal from said cell counting unit, and generating back-pressure signals corresponding to said counting signal; and
- a fault detecting unit receiving said control signals from said generating unit, and detecting faults from among said plurality of data cells, wherein said cell counting unit further comprises two logical subtractors and a counter.

24. An asynchronous transfer mode (ATM) switch having a starting stage consisting of a plurality of output switches, and a plurality of primary stages, each of said plurality of primary stages consisting of a plurality of multiplexing switch units, each of said multiplexing switch units consisting of a multiplexing apparatus and a copier, each of said plurality of primary stages receiving a plurality of data cells from a stage positioned just ahead of each of said plurality of primary stages, a last stage receiving data cells externally from said ATM switch, said last stage being leftmost stage of said plurality of primary stages, a first stage being rightmost stage of said plurality of primary stages, said starting stage receiving outputs of said first stage, said copier receiving outputs of said multiplexing apparatus and copying said outputs and outputting said received outputs and said copied outputs, said multiplexing apparatus comprising:

- a generating unit, consisting of a plurality of extracting parts, receiving a plurality of data cells from among said data cells, generating control signals corresponding to said plurality of data cells, and outputting said data cells and said control signals, said generating of said control signals being in accordance with routing tags in said received data cells;
- a shared FIFO buffer, said shared FIFO buffer having a plurality of buffer units;
- a buffer selecting unit, receiving said data cells and said control signals from said generating unit, selecting buffer units from said plurality of buffer units in accordance with said control signals, and transmitting said data cells to said selected buffer units;
- an outputting unit transmitting data cells stored in said selected buffer units;
- a cell counting unit receiving first counting data from said buffer selecting unit, receiving second counting data from said outputting unit, counting a quantity of data cells stored in said plurality of buffer units by using said first and second counting data transmitted from said buffer selecting unit and outputting unit, and transmitting a counting signal corresponding to said quantity of data cells to said outputting unit;
- a back-pressure signal generating unit receiving said counting signal from said cell counting unit, and generating back-pressure signals corresponding to said counting signal; and a fault detecting unit receiving said control signals from said generating unit, and detecting faults from among said plurality of data cells, wherein said back-pressure signal generating unit further comprises:

first and second back-pressure AND-gates receiving a back-pressure signal and said counting signal transmitting a first and second result respectively;

first and second back-pressure comparators receiving said first and second result respectively received from said first and second back-pressure AND-gates;

one back-pressure OR-gate adding the outputs of said first and second back-pressure comparators logically; and one back-pressure buffer storing the output of said back-pressure OR-gate.

25. A method of implementing an asynchronous transfer mode (ATM) switch, comprising the steps of:

detecting faults among data cells transmitted to said ATM switch having a starting stage consisting of a plurality of output switches, and a plurality of primary stages, each of said plurality of primary stages consisting of a plurality of multiplexing switch units, each of said multiplexing switch units consisting of a multiplexing apparatus and a copier, each of said plurality of primary stages receiving a plurality of data cells from a stage positioned just ahead of each of said plurality of primary stages, a last stage receiving data cells externally from said ATM switch, said last stage being leftmost stage of said plurality of primary stages, a first stage being rightmost stage of said plurality of primary stages, said starting stage receiving outputs of said first stage, said copier receiving outputs of said multiplexing apparatus and copying said outputs and outputting said received outputs and said copied outputs;

when said faults are detected at each respective stage of said plurality of primary stages, transmitting corresponding faults data to a previous stage, said previous stage being positioned upstream of said each respective stage of said plurality of stages;

when said faults are received from next stage, preventing data cells corresponding to said received faults from being transmitted to said next stage, said next stage being positioned downstream of said each respective stage of said plurality of stages;

transmitting a back-pressure signal to said previous stage when a quantity of data cells stored in buffer units is more than a predetermined value; and temporarily stopping transmitting of data cells to said next stage when said back-pressure signal is received.

26. Self-routing method of an N×N asynchronous transfer mode (ATM) switch having a starting stage consisting of a plurality of n×n output switches, and a plurality of primary stages, each of said plurality of primary stages consisting of a plurality of multiplexing switch units, each of said multiplexing switch units consisting of a multiplexing apparatus and a copier, each of said plurality of primary stages receiving a plurality of data cells from a stage positioned just ahead of each of said plurality of primary stages, a last stage receiving data cells externally from said ATM switch, said last stage being leftmost stage of said plurality of primary stages, a first stage being rightmost stage of said plurality of primary stages, said starting stage receiving outputs of said first stage, said copier receiving outputs of said multiplexing apparatus and copying said outputs and outputting said received outputs and said copied outputs, said method comprising the steps of:

when a first symbol N corresponds to a quantity of inputs of an asynchronous transfer mode switch, a second symbol A corresponds to a specific stage of said plurality of primary stages, a third symbol k corresponds to a kth position of said specific stage, a fourth symbol n corresponds to a first integer, said asynchronous transfer mode switch including N inputs and N outputs, said output switch including n input terminals and n output terminals, said multiplexing apparatus including n outputs and 2n inputs, a fifth symbol Z corresponds to a first number equaling $((\log_2(N/n))-A+1)$, and a sixth symbol i corresponds to routing data, setting a seventh symbol j to correspond to a second number equaling $\lfloor((k-1)n2^Z/N\rfloor$, where function $\lfloor X \rfloor$ corresponds to a largest integer among all integers less than or equal to X;

detecting a value of s(A,k), said s(A,k) being switch at the kth position of stage A;

identifying sg(A,j), said sg(A,j) being a first switch group j of stage A, said sg(A,j) including said value of s(A,k) detected in said detecting step, and initializing a value of routing tag i;

determining when a first condition corresponding to i<=(N/n) is true;

determining when a second condition corresponding to i>=(((jN/n)/(n2^Z))+1) is true;

determining when a third condition corresponding to i<=(((j+1)N)/(n2^Z)) is true;

determining when a fourth condition corresponding to f(i)=0 is true; and performing data cell-transmission.

27. The method of claim 26, wherein said data cell-transmission is not performed when said first condition corresponding to i<=(N/n) is determined to be not true.

28. The method of claim 26, wherein said value of said routing tag i is incremented by 1 when said first condition corresponding to i<=(N/n) is determined to be true and said second condition corresponding to i>=(((jN/n)/(n2^Z))+1) is determined to be not true.

29. The method of claim 26, wherein said value of said routing tag i is incremented by 1 when said first condition corresponding to i<=(N/n) is determined to be true and said second condition corresponding to i>=(((jN/n)/(n2^Z))+1) is determined to be true and said third condition corresponding to i<=(((j+1)N)/(n2^Z)) is determined to be not true.

30. The method of claim 26, wherein said value of said routing tag i is incremented by 1 when said first condition corresponding to i<=(N/n) is determined to be true and said second condition corresponding to i>=(((jN/n)/(n2^Z))+1) is determined to be true and said third condition corresponding to i<=(((j+1)N)/(n2^Z)) is determined to be true and said fourth condition corresponding to f(i)=0 is determined to be not true.

31. The method of claim 30, wherein said f(i) indicates a value of an ith routing tag bit.

32. An asynchronous transfer mode (ATM) switch, comprising:

a starting stage consisting of a plurality of output switches;

a plurality of primary stages interconnected and including a last stage, a first stage, and a plurality of intermediate stages, each respective one intermediate stage selected from among said plurality of intermediate stages receiving data cells from a respective upstream stage positioned upstream of said respective one intermediate stage, said upstream stage being selected from among said plurality of primary stages;

said last stage corresponding to a leftmost stage of said plurality of primary stages, and said last stage receiving a first plurality of data cells from said asynchronous transfer mode switch;

said first stage corresponding to a rightmost stage of said plurality of primary stages;

said starting stage receiving outputs from said first stage;

a plurality of multiplexing apparatuses, each one primary stage selected from among said plurality of primary stages including said plurality of multiplexing apparatuses;

wherein each one multiplexing apparatus selected from among said plurality of multiplexing apparatuses further comprises:

a generating unit, consisting of a plurality of extracting parts, receiving a second plurality of data cells from among said first plurality of data cells, generating control signals corresponding to said second plurality of data cells, and outputting said second plurality of data cells and said control signals, said generating of said control signals being in accordance with routing tags in said second plurality of data cells;

a shared FIFO buffer, said shared FIFO buffer having a plurality of buffer units;

a buffer selecting unit, receiving said second plurality of data cells and said control signals from said generating unit, selecting buffer units from said plurality of buffer units in accordance with said control signals, and transmitting said second plurality of data cells to said selected buffer units;

an outputting unit transmitting said second plurality of data cells stored in said selected buffer units;

a cell counting unit receiving first counting data from said buffer selecting unit, receiving second counting data from said outputting unit, counting a quantity of stored data cells stored in said plurality of buffer units by using said first and second counting data transmitted from said buffer selecting unit and outputting unit, and transmitting a counting signal corresponding to said quantity of stored data cells to said outputting unit, said stored data cells being among said second plurality of data cells;

a back-pressure signal generating unit receiving said counting signal from said cell counting unit, and generating back-pressure signals corresponding to said counting signal; and a fault detecting unit receiving said control signals from said generating unit, and detecting faults from among said second plurality of data cells.

\* \* \* \* \*